US012792731B2

(12) United States Patent
Samuel et al.

(10) Patent No.: US 12,792,731 B2
(45) Date of Patent: Nov. 10, 2026

(54) IDENTIFICATION OF .NET MALWARE WITH "UNMANAGED IMPHASH"

(71) Applicant: Palo Alto Networks, Inc., Santa Clara, CA (US)

(72) Inventors: Yaron Samuel, Tel Aviv (IL); Dominik Reichel, Kleive (DE); Robert Jung, Albuquerque, NM (US); Lauren Che, Dublin, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 0 days.

(21) Appl. No.: 18/919,894

(22) Filed: Oct. 18, 2024

(65) Prior Publication Data

US 2026/0111547 A1 Apr. 23, 2026

Related U.S. Application Data

(63) Continuation of application No. 17/557,992, filed on Dec. 21, 2021, now Pat. No. 12,153,676.

(51) Int. Cl.

| | |
|---|---|
| ***G06F 21/56*** | (2013.01) |
| ***G06F 21/53*** | (2013.01) |
| ***G06F 21/55*** | (2013.01) |
| ***H04L 9/32*** | (2006.01) |
| ***H04L 9/40*** | (2022.01) |

(52) U.S. Cl.

CPC ............ *G06F 21/562* (2013.01); *G06F 21/53* (2013.01); *G06F 21/554* (2013.01); *G06F 21/566* (2013.01); *H04L 9/3239* (2013.01); *H04L 63/0209* (2013.01); *G06F 2221/033* (2013.01)

(58) Field of Classification Search

None

See application file for complete search history.

(56) References Cited

U.S. PATENT DOCUMENTS

| | | | |
|---|---|---|---|
| 8,042,186 | B1 | 10/2011 | Polyakov |
| 8,499,283 | B2 | 7/2013 | Mony |
| 8,549,635 | B2 | 10/2013 | Muttik |
| 8,566,944 | B2 | 10/2013 | Peinado |
| 8,955,120 | B2 | 2/2015 | Antonov |
| 9,917,855 | B1 | 3/2018 | Li |
| 10,572,665 | B2 | 2/2020 | Jung |
| 10,762,200 | B1 | 9/2020 | Salem |
| 10,795,996 | B2 | 10/2020 | Chistyakov |
| 11,003,774 | B2 | 5/2021 | Saxe |
| 11,126,720 | B2 | 9/2021 | Miserendino |
| 2004/0205411 | A1 | 10/2004 | Hong |

(Continued)

FOREIGN PATENT DOCUMENTS

| | | |
|---|---|---|
| CN | 103842965 | 6/2014 |
| CN | 112005234 | 11/2020 |

*Primary Examiner* — William J. Goodchild

(74) *Attorney, Agent, or Firm* — Van Pelt, Yi & James LLP

(57) ABSTRACT

The present application discloses a method, system, and computer system for detecting malicious files. The method includes receiving a sample that comprises a .NET file, obtaining imported API function names based at least in part on a .NET header of the .NET file, determining a hash of a list of unmanaged imported API function names, and determining whether the sample is malware based at least in part on the hash of the list of unmanaged imported API function names.

21 Claims, 18 Drawing Sheets

(56) References Cited

U.S. PATENT DOCUMENTS

| | | | | |
|---|---|---|---|---|
| 2007/0266381 | A1* | 11/2007 | Kaushik | G06F 9/44521 717/162 |
| 2016/0337400 | A1 | 11/2016 | Gupta | |
| 2018/0096230 | A1 | 4/2018 | Luan | |
| 2019/0243976 | A1* | 8/2019 | Kuskov | G06F 21/51 |
| 2020/0202244 | A1 | 6/2020 | Kumar | |
| 2020/0372150 | A1* | 11/2020 | Salem | G06F 21/564 |
| 2021/0073374 | A1* | 3/2021 | Mookken | G06F 21/54 |
| 2021/0117544 | A1 | 4/2021 | Kurtz | |
| 2022/0067146 | A1* | 3/2022 | Cai | G06F 21/566 |

* cited by examiner

| Rid | Token | Offset | MappingFlags | MemberForward | ImportName | ImportScope | Info |
|---|---|---|---|---|---|---|---|
| 1 | 0x1C000001 | 0x0001B5C6 | 0x104 | 0xC9 | 0x18E5 | 1 | CreateProcess |
| 2 | 0x1C000002 | 0x0001B5CE | 0x100 | 0xCB | 0x190A | 1 | GetThreadContext |
| 3 | 0x1C000003 | 0x0001B5D6 | 0x100 | 0xCD | 0x1925 | 1 | Wow64GetThreadContext |
| 4 | 0x1C000004 | 0x0001B5DE | 0x100 | 0xCF | 0x1945 | 1 | SetThreadContext |
| 5 | 0x1C000005 | 0x0001B5E6 | 0x100 | 0xD1 | 0x1960 | 1 | Wow64SetThreadContext |
| 6 | 0x1C000006 | 0x0001B5EE | 0x100 | 0xD3 | 0x1980 | 1 | ReadProcessMemory |
| 7 | 0x1C000007 | 0x0001B5F6 | 0x100 | 0xD5 | 0x199C | 1 | WriteProcessMemory |
| 8 | 0x1C000008 | 0x0001B5FE | 0x100 | 0xD7 | 0x19B9 | 2 | NtUnmapViewOfSection |
| 9 | 0x1C000009 | 0x0001B606 | 0x100 | 0xD9 | 0x19E2 | 1 | VirtualAllocEx |
| 10 | 0x1C00000A | 0x0001B60E | 0x100 | 0xD8 | 0x19FB | 1 | ResumeThread |
| 11 | 0x1C00000B | 0x0001B616 | 0x100 | 0x1E1 | 0x3085 | 3 | LoadLibrary |
| 12 | 0x1C00000C | 0x0001B61E | 0x102 | 0x1E3 | 0x30A5 | 3 | GetProcAddress |

300

FIG. 3A

| Rid | Token | Offset | Name | Info |
|---|---|---|---|---|
| 1 | 0x1A000001 | 0x0001B5A2 | 0x18F3 | kernel32.dll |
| 2 | 0x1A000002 | 0x0001B5A4 | 0x19CE | ntdll.dll |
| 3 | 0x1A000003 | 0x0001B5A6 | 0x3091 | kernel32 |

310

FIG. 3B

| Rid | Token | Offset | MappingFlags | MemberForward | ImportName | ImportScope | Info |
|---|---|---|---|---|---|---|---|
| 1 | 0x1C000001 | 0x0000ACD2 | 0x100 | 5 | 0x8D4 | 1 | ZwAllocateVirtualMemory |
| 2 | 0x1C000002 | 0x0000ACDA | 0x100 | 7 | 0x935 | 1 | ZwFreeVirtualMemory |
| 3 | 0x1C000003 | 0x0000ACE2 | 0x100 | 9 | 0x952 | 1 | LdrGetProcedureAddress |
| 4 | 0x1C000004 | 0x0000ACEA | 0x240 | 0x99 | 0 | 2 | |
| 5 | 0x1C000005 | 0x0000ACC2 | 0x340 | 0x9D | 0 | 2 | |
| 6 | 0x1C000006 | 0x0000ACFA | 0x240 | 0x9F | 0 | 2 | |
| 7 | 0x1C000007 | 0x0000AD02 | 0x240 | 0xA1 | 0 | 2 | |
| 8 | 0x1C000008 | 0x0000AD0A | 0x240 | 0xA3 | 0 | 2 | |
| 9 | 0x1C000009 | 0x0000AD12 | 0x240 | 0xA5 | 0 | 2 | |
| 10 | 0x1C00000A | 0x0000AD1A | 0x240 | 0xA7 | 0 | 2 | |
| 11 | 0x1C00000B | 0x0000AD22 | 0x240 | 0xA9 | 0 | 2 | |
| 12 | 0x1C00000C | 0x0000AD2A | 0x240 | 0xAB | 0 | 2 | |
| 13 | 0x1C00000D | 0x0000AD32 | 0x240 | 0xAD | 0 | 2 | |
| 14 | 0x1C00000E | 0x0000AD3A | 0x240 | 0xAF | 0 | 2 | |
| 15 | 0x1C00000F | 0x0000AD42 | 0x240 | 0xB1 | 0 | 2 | |
| 16 | 0x1C000010 | 0x0000AD4A | 0x240 | 0xB3 | 0 | 2 | |

320

FIG. 3C

| Rid | Token | Offset | RVA | ImplFlags | Flags | Name | Signature | Paramlist | Info |
|---|---|---|---|---|---|---|---|---|---|
| 62 | 0x06000003E | 0x0000A0B0 | 0x22B8 | 0 | 0x13 | 0x1604 | 0x15E | 0x2F | <CtrlmplementationDetails>.Handle<System::Object^>.Get |
| 63 | 0x06000003F | 0x0000A0BE | 0x22E4 | 0 | 0x13 | 0x163C | 0x16A | 0x2F | <CtrlmplementationDetails>.Handle<System::Object^>.(dtor) |
| 64 | 0x060000040 | 0x0000ADCC | 0x2214 | 0 | 0x13 | 0x1677 | 0x178 | 0x2F | <CtrlmplementationDetails>.Handle<System::Object^>._handle |
| 65 | 0x060000041 | 0x0000A0DA | 0x2244 | 0 | 0x13 | 0x16B3 | 0x151 | 0x2F | <CtrlmplementationDetails>.Handle<System::Object^>.Set |
| 66 | 0x060000042 | 0x0000A0E8 | 0x270C | 0 | 0x13 | 0x16EB | 0x18B | 0x30 | _initterm_e |
| 67 | 0x060000043 | 0x0000A0F6 | 0x2740 | 0 | 0x13 | 0x1705 | 0x19D | 0x32 | _initterm |
| 68 | 0x060000044 | 0x0000A104 | 0x276C | 0 | 0x13 | 0x170F | 0x1AF | 0x34 | <CtrlmplementationDetails>.ThisModule.Handle |
| 69 | 0x060000045 | 0x0000A122 | 0x27C8 | 0 | 0x13 | 0x173C | 0x185 | 0x34 | _initterm_m |
| 70 | 0x060000046 | 0x0000A120 | 0x2794 | 0 | 0x13 | 0x1748 | 0x1CD | 0x36 | <CtrlmplementationDetails>.ThisModule.ResolveMethod<voidco |
| 71 | 0x060000047 | 0x0000A12E | 0x27FC | 0 | 0x13 | 0x17A6 | 0x1DE | 0x37 | _CxCallUnwindDtor |
| 72 | 0x060000048 | 0x0000A13C | 0x2848 | 0 | 0x13 | 0x17C7 | 0x1DE | 0x39 | _CxCallUnwindDeltor |
| 73 | 0x060000049 | 0x0000A14A | 0x2894 | 0 | 0x13 | 0x17DF | 0x1EA | 0x3B | _CxCallUnwindVecDtor |
| 74 | 0x06000004A | 0x0000A158 | 0x136F | 0x85 | 0x6013 | 0x180F | 0x206 | 0x40 | _WinMainCRTStartup |
| 75 | 0x06000004B | 0x0000A166 | 0x1963 | 0x85 | 0x6013 | 0x1822 | 0x20A | 0x40 | _getFiberPtrld |
| 76 | 0x06000004C | 0x0000A174 | 0x29FC | 0x85 | 0x6013 | 0x1831 | 0x211 | 0x40 | _amsg_exit |
| 77 | 0x06000004D | 0x0000A182 | 0x16D9 | 0x85 | 0x6013 | 0x183C | 0xA6 | 0x40 | _security_init_cookie |
| 78 | 0x06000004E | 0x0000A190 | 0x2A92 | 0x85 | 0x6013 | 0x1853 | 0x218 | 0x40 | Sleep |
| 79 | 0x06000004F | 0x0000A19E | 0xB0A | 0x85 | 0x6013 | 0x1859 | 0x222 | 0x40 | <CtrlmplementationDetails>.ThisModuleLoadException |

330

FIG. 3D

| Rid | Token | Offset | Name | Info |
| --- | --- | --- | --- | --- |
| 1 | 0x1A000001 | 0x0000ACCE | 0x483 | ntdll.dll |
| 2 | 0x1A000002 | 0x0000ACD0 | 0 | |

340

FIG. 3E

| Rid | Token | Offset | RVA | ImplFlags | Flags | Name | Signature | Paramlist | Info |
|---|---|---|---|---|---|---|---|---|---|
| 77 | 0x06000004D | 0x0000A182 | 0x16D9 | 0x85 | 0x6013 | 0x183C | 0xA6 | 0x40 | _security_init_cookie |
| 78 | 0x06000004E | 0x0000A190 | 0x2A92 | 0x85 | 0x6013 | 0x1853 | 0x218 | 0x40 | Sleep |
| 79 | 0x06000004F | 0x0000A19E | 0xB0A | 0x85 | 0x6013 | 0x1859 | 0x222 | 0x40 | <CtrlmplementationDetails>.ThisModuleLoadException |
| 80 | 0x060000050 | 0x0000A1AC | 0x2AF8 | 0x85 | 0x6013 | 0x1859 | 0x22B | 0x40 | <CtrlmplementationDetails>.ThisModuleLoadException |
| 81 | 0x060000051 | 0x0000A1BA | 0x2B04 | 0x85 | 0x6013 | 0x188D | 0xA6 | 0x40 | <CtrlmplementationDetails>.DoDllLanguageSupportValidation |
| 82 | 0x060000052 | 0x0000A1C8 | 0x2AF2 | 0x85 | 0x6013 | 0x18C7 | 0x232 | 0x40 | <CtrlmplementationDetails>.ThrowNestedModuleLoadException |
| 83 | 0x060000053 | 0x0000A1D6 | 0x2AFE | 0x85 | 0x6013 | 0x1901 | 0x23C | 0x40 | <CtrlmplementatioDetails>.RegisterModuleUnitializer |
| 84 | 0x060000054 | 0x0000A1E4 | 0x2AEC | 0x85 | 0x6013 | 0x1938 | 0x245 | 0x40 | <CtrlmplementationDetails>.DoCallBackInDefaultDomain |
| 85 | 0x060000055 | 0x0000A1F2 | 0x2A08 | 0x85 | 0x6013 | 0x196D | 0xA6 | 0x40 | _cexit |
| 86 | 0x060000056 | 0x0000A200 | 0x2A4A | 0x85 | 0x6013 | 0x1974 | 0x258 | 0x40 | _encode_pointer |

360

FIG. 3G

IDENTIFICATION OF .NET MALWARE WITH "UNMANAGED IMPHASH"

CROSS REFERENCE TO OTHER APPLICATIONS

This application is a continuation of U.S. patent application Ser. No. 17/557,992, entitled IDENTIFICATION OF .NET MALWARE WITH "UNMANAGED IMPHASH" filed Dec. 21, 2021.

BACKGROUND OF THE INVENTION

Nefarious individuals attempt to compromise computer systems in a variety of ways. As one example, such individuals may embed or otherwise include malicious software ("malware") in email attachments and transmit or cause the malware to be transmitted to unsuspecting users. When executed, the malware compromises the victim's computer. Some types of malware will instruct a compromised computer to communicate with a remote host. For example, malware can turn a compromised computer into a "bot" in a "botnet," receiving instructions from and/or reporting data to a command and control (C&C) server under the control of the nefarious individual. One approach to mitigating the damage caused by malware is for a security company (or other appropriate entity) to attempt to identify malware and prevent it from reaching/executing on end user computers. Another approach is to try to prevent compromised computers from communicating with the C&C server. Unfortunately, malware authors are using increasingly sophisticated techniques to obfuscate the workings of their software. As one example, some types of malware use Domain Name System (DNS) queries to exfiltrate data. Accordingly, there exists an ongoing need for improved techniques to detect malware and prevent its harm.

BRIEF DESCRIPTION OF THE DRAWINGS

Various embodiments of the invention are disclosed in the following detailed description and the accompanying drawings.

FIG. 3A is an illustration of an ImplMap table of a .NET header for an example .NET file.

FIG. 3B is an illustration of a ModuleRef table of an example .NET file.

FIG. 3C is an illustration of an ImplMap table of a .NET header for an example .NET file.

FIG. 3D is an illustration of a MethodDef table for an example .NET file.

FIG. 3E is an illustration of a ModuleRef table for an example .NET file.

FIG. 3G is an illustration of a MethodDef table for an example .NET file.

DETAILED DESCRIPTION

Figure 1:
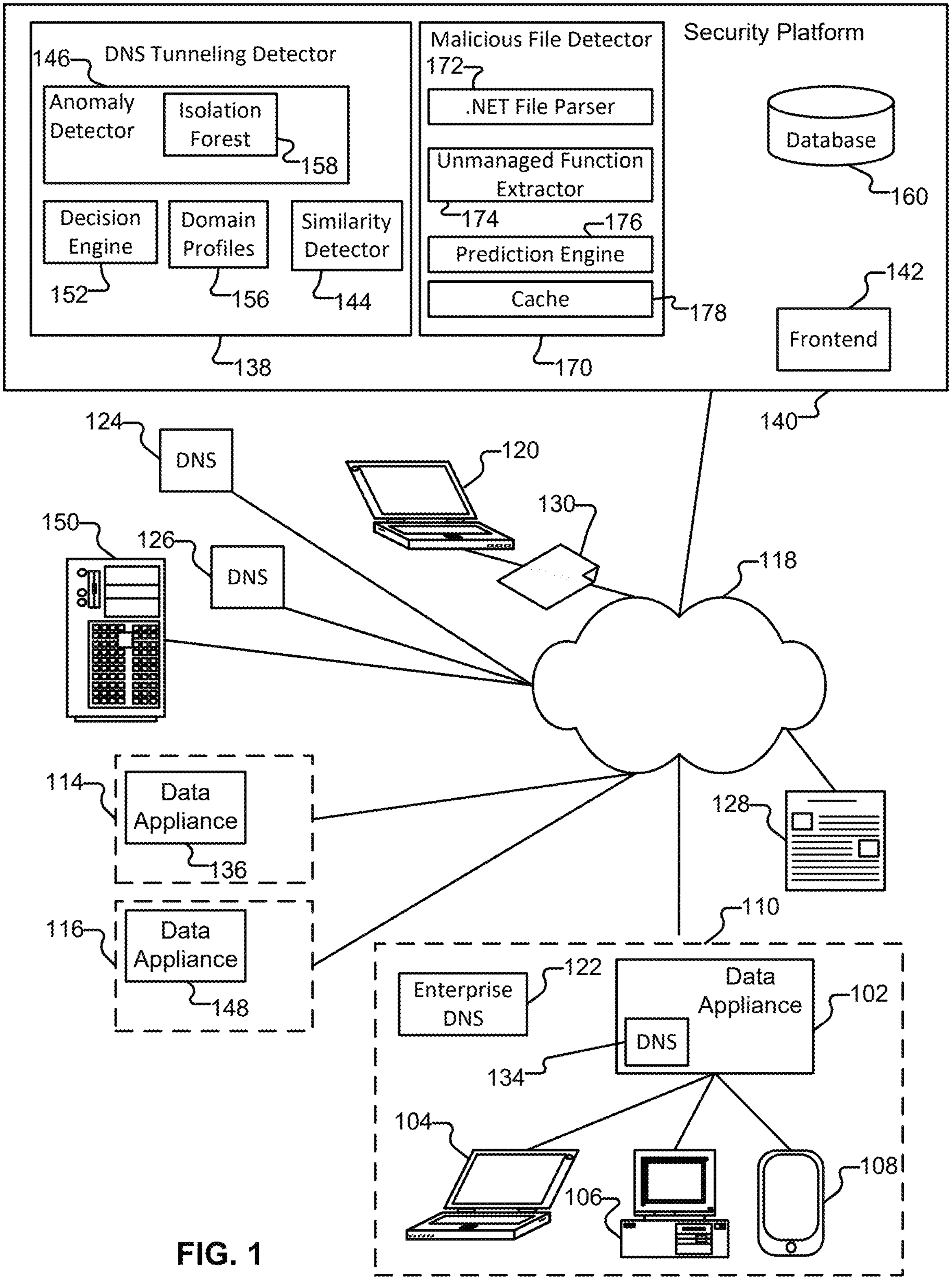
FIG. 1 is a block diagram of an environment in which a malicious file is detected or suspected according to various embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

As used herein, a security entity is a network node (e.g., a device) that enforces one or more security policies with respect to information such as network traffic, files, etc. As an example, a security entity may be a firewall. As another example, a security entity may be implemented as a router, a switch, a DNS resolver, a computer, a tablet, a laptop, a smartphone, etc. Various other devices may be implemented as a security entity. As another example, a security may be implemented as an application running on a device, such as an anti-malware application.

As used herein, malware refers to an application that engages in behaviors, whether clandestinely or not (and whether illegal or not), of which a user does not approve/would not approve if fully informed. Examples of malware include trojans, viruses, rootkits, spyware, hacking tools, keyloggers, etc. One example of malware is a desktop application that collects and reports to a remote server the end user's location (but does not provide the user with location-based services, such as a mapping service). Another example of malware is a malicious Android Application Package .apk (APK) file that appears to an end user to be a free game, but stealthily sends SMS premium messages (e.g., costing $10 each), running up the end user's phone bill. Another example of malware is an Apple iOS flashlight application that stealthily collects the user's contacts and sends those contacts to a spammer. Other forms of malware can also be detected/thwarted using the techniques described herein (e.g., ransomware). Further, while malware signatures are described herein as being generated for malicious applications, techniques described herein can also be used in various embodiments to generate profiles for other kinds of applications (e.g., adware profiles, goodware profiles, etc.).

As used herein, unmanaged code or an unmanaged function refers to an imported win32 API function, as opposed to regular .NET code which is referred to as "managed code". As an example, such unmanaged code or unmanaged function is generally not reflected/comprised in the PE header of a .NET file; rather such unmanaged code or unmanaged function is imported via the .NET header of the .NET file.

According to related art, malware is identified using machine learning models. Machine learning models according to related art are trained/developed based using portable executable (PE) structures based on features such as imports, headers and sections. The machine learning models use such imports, headers and sections to distinguish between malware and benign files. However, the PE file structure for Microsoft Windows PE installer based files look extremely similar between malicious and benign files. Accordingly, using the PE file structure for Microsoft Windows PE installer to detect malware is not very reliable because of the extreme difficulty in distinguishing between malicious and benign files based on such PE file structure. For example, use of the PE file structure to detect malicious files for Microsoft Windows PE installer files leads to higher false positives and poor detection rate. An example of Microsoft Windows PE installer files used for benign purposes is Microsoft Windows Nullsoft Scriptable Install System (NSIS) installers, which are popularly used by legitimate products and in corporate environments. Each machine learning models trained to analyze PE structures to distinguish between malicious Microsoft Windows PE installer files and benign Microsoft Windows PE installer files will be unable to accurately detect malicious files.

A system, method, and/or device for detecting a malicious file is disclosed. The system includes one or more processors and a memory coupled to the one or more processors and configured to provide the one or more processors with instructions. The one or more processors are configured to receive a sample that comprises a .NET file, obtain imported API function names based at least in part on a .NET header of the .NET file, determine a hash of a list of unmanaged imported API function names, and determine whether the sample is malware based at least in part on the hash of the list of unmanaged imported API function names.

According to various embodiments, the system for detecting a malicious file is implemented by one or more servers. The one or more servers may provide a service for one or more customers and/or security entities. For example, the one or more servers detect malicious files or determine/assess whether files are malicious, and provide an indication of whether a file is malicious to the one or more customers and/or security entities. The one or more servers provide to a security entity the indication that a file is malicious in response to a determination that the file is malicious and/or in connection with an updated to a mapping of files to indications of whether the files of malicious (e.g., an update to a blacklist comprising identifier(s) associated with a malicious file(s)). As another example, the one or more servers determine whether a file is malicious in response to a request from a customer or security for an assessment of whether a file is malicious, and the one or more servers provide a result of such a determination.

According to various embodiments, the system for detecting a malicious file is implemented by a security entity. For example, the system for detecting a malicious file is implemented by a firewall. As another example, the system for detecting the malicious file is implemented by an application such as anti-malware application running on a device (e.g., a computer, laptop, mobile phone, etc.). According to various embodiments, the security entity receives a .NET file, obtains a .NET header of the .NET file, and determines whether the .NET file is malicious based at least in part on .NET header of the .NET file. In response to determining that the .NET file is malicious, the security entity applies one or more security entities with respect to the .NET file. In response to determining that the .NET file is not malicious (e.g., that the .NET file is benign), the security entity handles the .NET file as non-malicious traffic. In some embodiments, the security entity determines whether the file is malicious based at least in part on determining (e.g., obtaining) imported API function names based at least in part on a .NET header of the .NET file, determining (e.g., computing) a hash of a list of unmanaged imported API function names, and determining whether the hash of the list of unmanaged imported API function names corresponding to the .NET file matches a hash associated with a file deemed to be malicious. For example, the security entity performs a lookup with respect to a mapping of hashes (e.g., hashes of unmanaged imported API function names) to malicious files to determine whether the mapping comprises a matching hash (e.g., that the mapping comprises a record for a file having a hash of unmanaged imported API function names that matches the computed hash for the .NET file).

Portable executable (PE) files are often coded to import functions from external libraries in order to interact with various OS components. Related art methods for detecting malware uses the sequence of imports, hashes the sequence of imports to obtain a hash value, and compares the hash value against a known block-list of "Import Table Hashes" (imphash). Related art methods for detecting malware imports obtains imported API function names and corresponding library names from the PE header of a file being analyzed. However, the determining API function names and corresponding library names from the PE header and use of such API function names and corresponding library names to detect malware is not ideal for .NET files because almost all .NET PE files have similar import tables. As an example, the majority of .NET assemblies have a single imported function named "_CorExeMain" (EXE) or "_CorDllMain" (DLL) in the PE header. Generally, only a small portion of NET assemblies have more imports in the PE header. Such .NET files are generally created with Visual C++ and the C++/CLI extension. The import functions included in the PE header are generally determined by the .NET compiler and are not influenced by the code itself. This phenomenon happens because .NET code is not compiled into a native assembly, rather it is compiled into an intermediate language or intermediate bytecode (MSIL) which is then being executed by a .NET runtime.

Accordingly, the use of import functions extracted from a PE header of a .NET file does not provide an accurate detection of malware. However, various .NET malware families still need to interact directly with the win32 API, for example, to inject code into other processes. Such code may be injected into other processes from .NET, but the win32 functions to do so are not reflected in the import table of the PE Header for .NET files. Rather, code injection functions are generally comprised (or imported) via a .NET header of a .NET file. The .NET header is a header comprised in a .NET file (e.g., in addition to the PE header). For example, the .NET header is different/distinct from the PE header of the .NET file. A .NET file comprises both a PE header and a .NET header. A .NET header generally comprises data streams and tables including various information pertaining to the .NET assembly. One such data stream comprised in the .NET header is named "#Strings" and comprises a list of strings used in a file. The list comprised in the #Strings stream also includes the name(s) of any used unmanaged win32 API function. Furthermore, one of the tables comprised in the .NET header is named "ImplMap" and includes various information about any imported unmanaged functions.

Various embodiments parse a .NET header of a .NET file, extract unmanaged imports (e.g., unmanaged functions, libraries, etc.) from one or more fields in the .NET header, and determine whether the .NET file is malicious based at least in part on the extracted unmanaged imports. In some embodiments, a system determines a list of unmanaged imports corresponding to a .NET file (e.g., extracted from a field(s) in the .NET header), and determines (e.g., computes) a hash of the list of unmanaged imports. The hash of the list of unmanaged imports may be determined based on a predefined hashing function. Examples of the hashing function include a SHA-256 hashing function, an MD5 hashing function, an SHA-1 hashing function, etc. Various other hashing functions may be implemented. As used herein, unmanaged imphash refers to a value obtained by determining a hash of the list of unmanaged imports (e.g., the unmanaged imports extracted from a field(s) in the .NET header).

According to various embodiments, information comprised in the .NET header of a .NET file is used in connection with determining whether a file is malicious. In some embodiments, the system uses information comprised in the ImplMap table and information comprised in the strings of the "#Strings" data stream to determine a set of unmanaged function <-> library name pairs. The system may determine a list pertaining to the unmanaged imported functions of the .NET file (e.g., imported via the .NET header). In some embodiments, the system determines a hash of the list pertaining to the unmanaged imported functions of the .NET file. For example, the system determines an Unmanaged Imphash corresponding to the .NET file. The Unmanaged Imphash may be used to determine whether the file is malicious. For example, the system may query a list of files deemed to be malicious (e.g., a blacklist) to determine whether the list comprises a record having an Unmanaged Imphash matching the Unmanaged Imphash determined for the .NET file.

According to various embodiments, the system analyzes the .NET file in a sandbox environment. For example, the system parses the .NET file and extracts information from the .NET header within a sandbox environment. The system may be implemented by a virtual machine (VM) operating in a sandbox environment.

In some embodiments, the system receives historical information pertaining to a maliciousness of a file (e.g., historical datasets of malicious files and historical datasets of benign files) from a third party service such as VirusTotal®. The third party service may provide a set of files deemed to be malicious and a set of files deemed to be benign. As an example, the third party service may analyze the file and provide an indication whether a file is malicious or benign, and/or a score indicating the likelihood that the file is malicious. The third party service may provide Unmanaged Imphashes corresponding to the files comprised in the historical dataset (e.g., a blacklist of files, a whitelist of files, etc.), or the list may comprise indications of whether historical Unmanaged Imphashes are malicious. The system may receive (e.g., at predefined intervals, as updates are available, etc.) updates from the third party service such as with newly identified benign or malicious files, corrections to previous mis-classifications, etc. In some embodiments, an indication of whether a file in the historical datasets corresponds to a social score such as a community-based score or rating (e.g., a reputation score) indicating that a file is malicious or likely to be malicious.

According to various embodiments, a security entity and/or network node (e.g., a client, device, etc.) handles a file based at least in part on an indication that the file is malicious and/or that the file matches a file indicated to be malicious. In response to receiving indication that the file (e.g., the sample is malicious), the security network and/or network node may update a mapping of files to an indication of whether the corresponding file is malicious, and/or a blacklist of files. In some embodiments, the security entity and/or the network node receives a signature pertaining to a file (e.g., a sample deemed to be malicious), and the security entity and/or the network node stores the signature of the file for use in connection with detecting whether files obtained, such as via network traffic, are malicious (e.g., based at least in part on comparing a signature generated for the file with a signature for a file comprised in a blacklist of files). As an example, the signature may be a hash. In some embodiments, the signature for the file is the Unmanaged Imphash corresponding to such file.

Firewalls typically deny or permit network transmission based on a set of rules. These sets of rules are often referred to as policies (e.g., network policies, network security policies, security policies, etc.). For example, a firewall can filter inbound traffic by applying a set of rules or policies to prevent unwanted outside traffic from reaching protected devices. A firewall can also filter outbound traffic by applying a set of rules or policies (e.g., allow, block, monitor, notify or log, and/or other actions can be specified in firewall rules or firewall policies, which can be triggered based on various criteria, such as are described herein). A firewall can also filter local network (e.g., intranet) traffic by similarly applying a set of rules or policies.

Security devices (e.g., security appliances, security gateways, security services, and/or other security devices) can include various security functions (e.g., firewall, anti-malware, intrusion prevention/detection, Data Loss Prevention (DLP), and/or other security functions), networking functions (e.g., routing, Quality of Service (QoS), workload balancing of network related resources, and/or other networking functions), and/or other functions. For example, routing functions can be based on source information (e.g., IP address and port), destination information (e.g., IP address and port), and protocol information.

A basic packet filtering firewall filters network communication traffic by inspecting individual packets transmitted over a network (e.g., packet filtering firewalls or first generation firewalls, which are stateless packet filtering firewalls). Stateless packet filtering firewalls typically inspect the individual packets themselves and apply rules based on the inspected packets (e.g., using a combination of a packet's source and destination address information, protocol information, and a port number).

Application firewalls can also perform application layer filtering (e.g., application layer filtering firewalls or second generation firewalls, which work on the application level of the TCP/IP stack). Application layer filtering firewalls or application firewalls can generally identify certain applications and protocols (e.g., web browsing using HyperText Transfer Protocol (HTTP), a Domain Name System (DNS) request, a file transfer using File Transfer Protocol (FTP), and various other types of applications and other protocols, such as Telnet, DHCP, TCP, UDP, and TFTP (GSS)). For example, application firewalls can block unauthorized protocols that attempt to communicate over a standard port (e.g., an unauthorized/out of policy protocol attempting to sneak through by using a non-standard port for that protocol can generally be identified using application firewalls).

Stateful firewalls can also perform state-based packet inspection in which each packet is examined within the context of a series of packets associated with that network transmission's flow of packets. This firewall technique is generally referred to as a stateful packet inspection as it maintains records of all connections passing through the firewall and is able to determine whether a packet is the start of a new connection, a part of an existing connection, or is an invalid packet. For example, the state of a connection can itself be one of the criteria that triggers a rule within a policy.

Advanced or next generation firewalls can perform stateless and stateful packet filtering and application layer filtering as discussed above. Next generation firewalls can also perform additional firewall techniques. For example, certain newer firewalls sometimes referred to as advanced or next generation firewalls can also identify users and content (e.g., next generation firewalls). In particular, certain next generation firewalls are expanding the list of applications that these firewalls can automatically identify to thousands of applications. Examples of such next generation firewalls are commercially available from Palo Alto Networks, Inc. (e.g., Palo Alto Networks' PA Series firewalls). For example, Palo Alto Networks' next generation firewalls enable enterprises to identify and control applications, users, and content—not just ports, IP addresses, and packets-using various identification technologies, such as the following: APP-ID for accurate application identification, User-ID for user identification (e.g., by user or user group), and Content-ID for real-time content scanning (e.g., controlling web surfing and limiting data and file transfers). These identification technologies allow enterprises to securely enable application usage using business-relevant concepts, instead of following the traditional approach offered by traditional port-blocking firewalls. Also, special purpose hardware for next generation firewalls (implemented, for example, as dedicated appliances) generally provide higher performance levels for application inspection than software executed on general purpose hardware (e.g., such as security appliances provided by Palo Alto Networks, Inc., which use dedicated, function specific processing that is tightly integrated with a single-pass software engine to maximize network throughput while minimizing latency).

Advanced or next generation firewalls can also be implemented using virtualized firewalls. Examples of such next generation firewalls are commercially available from Palo Alto Networks, Inc. (e.g., Palo Alto Networks' VM Series firewalls, which support various commercial virtualized environments, including, for example, VMware® ESXi™ and NSX™ Citrix® Netscaler SDX™, KVM/OpenStack (Centos/RHEL, Ubuntu®), and Amazon Web Services (AWS)). For example, virtualized firewalls can support similar or the exact same next-generation firewall and advanced threat prevention features available in physical form factor appliances, allowing enterprises to safely enable applications flowing into, and across their private, public, and hybrid cloud computing environments. Automation features such as VM monitoring, dynamic address groups, and a REST-based API allow enterprises to proactively monitor VM changes dynamically feeding that context into security policies, thereby eliminating the policy lag that may occur when VMs change.

The system improves detection of malicious files. Further, the system further improves the handling of network traffic by preventing (or improving prevention of) malicious files being across a network such as among nodes within a network, or preventing malicious files from entering a network. The system determines .NET files that are deemed to be malicious or likely to be malicious such as based on a .NET header of the .NET file. Related art detection techniques that use a structure of PE header for a file may be insufficient/inaccurate with respect to files having similar structures/profiles among malicious or benign files. Further, because .NET files are compiled into an intermediate language, classifying files as malicious/benign is difficult using machine learning classifiers or manually written YARA rules. YARA is a tool aimed at (but not limited to) helping malware researchers to identify and classify malware samples). YARA rules are used to classify and identify malware samples by creating descriptions of malware families based on textual or binary patterns. Further, the system can provide accurate and low latency updates to security entities (e.g., endpoints, firewalls, etc.) to enforce one or more security policies (e.g., predetermined and/or customer-specific security policies) with respect to traffic comprising malicious files (e.g., malicious .NET files). Accordingly, the system prevents proliferation of malicious traffic (e.g., files) to nodes within a network.

FIG. 1 is a block diagram of an environment in which a malicious file is detected or suspected according to various embodiments. In the example shown, client devices 104-108 are a laptop computer, a desktop computer, and a tablet (respectively) present in an enterprise network 110 (belonging to the "Acme Company"). Data appliance 102 is configured to enforce policies (e.g., a security policy) regarding communications between client devices, such as client devices 104 and 106, and nodes outside of enterprise network 110 (e.g., reachable via external network 118). Examples of such policies include ones governing traffic shaping, quality of service, and routing of traffic. Other examples of policies include security policies such as ones requiring the scanning for threats in incoming (and/or outgoing) email attachments, website content, files exchanged through instant messaging programs, and/or other file transfers. In some embodiments, data appliance 102 is also configured to enforce policies with respect to traffic that stays within (or from coming into) enterprise network 110.

Techniques described herein can be used in conjunction with a variety of platforms (e.g., desktops, mobile devices, gaming platforms, embedded systems, etc.) and/or a variety of types of applications (e.g., Android .apk files, iOS applications, Windows PE files, Adobe Acrobat PDF files, Microsoft Windows PE installers, etc.). In the example environment shown in FIG. 1, client devices 104-108 are a laptop computer, a desktop computer, and a tablet (respectively) present in an enterprise network 140. Client device 120 is a laptop computer present outside of enterprise network 110.

Data appliance 102 can be configured to work in cooperation with a remote security platform 140. Security platform 140 can provide a variety of services, including performing static and dynamic analysis on malware samples, providing a list of signatures of known-malicious files to data appliances, such as data appliance 102 as part of a subscription, detecting malicious files (e.g., an on-demand detection, or a periodical based updates to a mapping of files to indications of whether the file is malicious or benign), providing a likelihood that a file is malicious or benign, provide/update a whitelist of files deemed to be benign, provide/update files deemed to be malicious, identifying malicious domains, detecting malicious files, predicting whether a file is malicious, and providing an indication of that a file is malicious (or benign). In various embodiments, results of analysis (and additional information pertaining to applications, domains, etc.) are stored in database 160. In various embodiments, security platform 140 comprises one or more dedicated commercially available hardware servers (e.g., having multi-core processor(s), 32 G+ of RAM, gigabit network interface adaptor(s), and hard drive(s)) running typical server-class operating systems (e.g., Linux). Security platform 140 can be implemented across a scalable infrastructure comprising multiple such servers, solid state drives, and/or other applicable high-performance hardware. Security platform 140 can comprise several distributed components, including components provided by one or more third parties. For example, portions or all of security platform 140 can be implemented using the Amazon Elastic Compute Cloud (EC2) and/or Amazon Simple Storage Service (S3). Further, as with data appliance 102, whenever security platform 140 is referred to as performing a task, such as storing data or processing data, it is to be understood that a sub-component or multiple sub-components of security platform 140 (whether individually or in cooperation with third party components) may cooperate to perform that task. As one example, security platform 140 can optionally perform static/dynamic analysis in cooperation with one or more virtual machine (VM) servers. An example of a virtual machine server is a physical machine comprising commercially available server-class hardware (e.g., a multi-core processor, 32+ Gigabytes of RAM, and one or more Gigabit network interface adapters) that runs commercially available virtualization software, such as VMware ESXi, Citrix XenServer, or Microsoft Hyper-V. In some embodiments, the virtual machine server is omitted. Further, a virtual machine server may be under the control of the same entity that administers security platform 140, but may also be provided by a third party. As one example, the virtual machine server can rely on EC2, with the remainder portions of security platform 140 provided by dedicated hardware owned by and under the control of the operator of security platform 140.

According to various embodiments, security platform 140 comprises DNS tunneling detector 138 and/or malicious file detector 170. Malicious file detector 170 is used in connection with determining whether a file (e.g., a .NET file) is malicious. In response to receiving a sample, malicious file detector 170 analyzes the file and determines whether the file is malicious. For example, malicious file detector 170 determines whether an Unmanaged Imphash corresponding to the file being analyzes matches a file comprised in a historical dataset (e.g., a list of files deemed malicious, a list of files deemed benign, etc.). In some embodiments, malicious file detector 170 receives a sample that comprises a .NET file, obtains imported API function names based at least in part on a .NET header of the .NET file, determines a hash of a list of unmanaged imported API function names (e.g., an Unmanaged Imphash), and determines whether the sample is malware based at least in part on the hash of the list of unmanaged imported API function names. In some embodiments, malicious file detector 170 comprises one or more of .NET file parser 172, unmanaged function extractor 174, prediction engine 176, and/or cache 178.

.NET file parser 172 is used in connection with obtaining information pertaining to the sample such as a .NET file. In some embodiments, .NET file parser 172 obtains a .NET header and/or information from the .NET header of the .NET file. The .NET file parser 172 obtains one or more data streams comprised in the .NET header and/or one or more tables comprised in (or referenced by) the .NET header. For example, the .NET file parser 172 obtains the #Strings stream comprised in the .NET header. As another example, the .NET file parser 172 obtains the ImplMap from the .NET file (e.g., from the .NET header). In some embodiments, the .NET file parser 172 determines a set of imported functions (e.g., imported API function names) that are imported to the .NET file.

Unmanaged function extractor 174 is used in connection with determining (e.g., obtaining) a set of unmanaged imported functions that are imported to the .NET file. For example, unmanaged function extractor 174 determines the set of unmanaged imported functions from the set of imported functions (e.g., imported API function names) that are imported to the .NET file. According to various embodiments, unmanaged function extractor 174 uses information comprised in (or referenced by) the .NET header to determine unmanaged code or an unmanaged function (e.g., the unmanaged function and corresponding library). In some embodiments, unmanaged function extractor 174 determines a set of used unmanaged win32 API functions imported to the .NET file. Unmanaged function extractor 174 provides the set of unmanaged imported functions (or names of the unmanaged functions) and/or corresponding libraries that are imported to the .NET file to prediction engine 176.

Prediction engine 176 is used to determine whether the file (e.g., the .NET file) is malicious. Prediction engine 176 uses information comprised in the .NET header in connection with determining whether the corresponding .NET file is malicious. For example, prediction engine 176 obtains the set of unmanaged imported functions (or names of the unmanaged functions) and/or corresponding libraries that are imported to the .NET file from unmanaged function extractor 174. In some embodiments, prediction engine 176 determines a hash (e.g., a hash value) for the set of unmanaged imported functions (or names of the unmanaged functions) and/or corresponding libraries that are imported to the .NET file. For example, prediction engine 176 computes the Unmanaged Imphash corresponding to the .NET file. Prediction engine 176 determines a list of the set of unmanaged imported functions (or names of the unmanaged functions) and/or corresponding libraries that are imported to the .NET file, and determines the hash of such list. The list of the set of unmanaged imported functions and/or corresponding libraries is determined according to a predetermined order. For example, an ordering of the unmanaged imported functions and/or corresponding libraries corresponds to an order in which the unmanaged functions are comprised in an element of the .NET header (e.g., an order in which the unmanaged functions are comprised in the #Strings stream and/or table comprised in, or referenced by, the .NET table). Various other orders in which unmanaged functions are added to the list (or in which the list is arranged) may be implemented. Prediction engine 176 formats the list and/or unmanaged functions (e.g., unmanaged function names and/or corresponding libraries) according to a predetermined format. Examples of the predetermined format include (i) lower case alphanumeric strings, (ii) removal of file extensions, (iii) removal of library extensions (e.g., removal of .dll from the corresponding library name), (iv) appending an unmanaged function name and corresponding library, and (v) use of a predefined separator between the unmanaged function name and corresponding library. In some embodiments, prediction engine 176 appends a function name (e.g., unmanaged function name) to the corresponding library, and separates the function name from the corresponding library by a dot or period (e.g., "."). In response to determining a string by appending the function name and library (e.g., with the predefined separator such as "."), prediction engine 176 adds such entry to the list of the set of unmanaged imported functions and/or corresponding libraries.

According to various embodiments, prediction engine 176 determines a hash with respect to the list of the set of unmanaged imported functions and/or corresponding libraries. Various hash functions may be used in connection with determining the hash. Examples of the hashing function include a SHA-256 hashing function, an MD5 hashing function, an SHA-1 hashing function, etc. Various other hashing functions may be implemented. Prediction engine 176 uses the hashing function to determine the Unmanaged Imphash corresponding to the .NET file.

According to various embodiments, prediction engine 176 uses information obtained from the .NET header of the .NET file to determine whether the .NET file is malicious. In some embodiments, prediction engine 176 uses the Unmanaged Imphash corresponding to the .NET file in connection determining whether the .NET file is malicious. As an example, in response to determining the Unmanaged Imphash corresponding to the .NET file, prediction engine 176 determines whether the Unmanaged Imphash matches an Unmanaged Imphash for a file deemed to be malicious. As an example, in response to determining the Unmanaged Imphash corresponding to the .NET file, prediction engine 176 determines whether the Unmanaged Imphash matches an Unmanaged Imphash for a file deemed to be benign. In some embodiments, malicious file detector 170 (e.g., prediction engine 176) determines whether information pertaining to a particular file (e.g., the Unmanaged Imphash corresponding to a .NET file being analyzed) is comprised in a dataset of historical files and historical information associated with the historical dataset indicating whether a particular file is malicious (e.g., a third party service such as VirusTotal™). In response to determining that information pertaining to a particular file is not comprised in, or available in, dataset of historical files and historical information, malicious file detector 170 may deem the file to be benign (e.g., deem the file to not be malicious). An example of the historical information associated with the historical files indicating whether a particular file is malicious corresponds to a VirusTotal® (VT) score. In the case of a VT score greater than 0 for a particular file, the particular file is deemed malicious by the third party service. In some embodiments, the historical information associated with the historical file indicating whether a particular file is malicious corresponds to a social score such as a community-based score or rating (e.g., a reputation score) indicating that a file is malicious or likely to be malicious. The historical information (e.g., from a third party service, a community-based score, etc.) indicates whether other vendors or cyber security organizations deem the particular file to be malicious.

In some embodiments, malicious file detector 170 (e.g., prediction engine 176) determines that a received file is newly analyzed (e.g., that the file is not within the historical information/dataset, is not on a whitelist or blacklist, etc.). Malicious file detector 170 (e.g., script extractor module 172) may detect that a file is newly analyzed in response to security platform 140 receiving the file from a security entity (e.g., a firewall) or endpoint within a network. For example, malicious file detector 170 determines that a file is newly analyzed contemporaneous with security platform 140, or malicious file detector 170, receiving the file. As another example, malicious file detector 170 (e.g., prediction engine 176) determines that a file is newly analyzed according to a predefined schedule (e.g., daily, weekly, monthly, etc.), such as in connection with a batch process. In response to determining that a file is received that has not yet been analyzed with respect to whether such file is malicious (e.g., the system does not comprise historical information with respect to such file), malicious file detector 170 determines whether to use a .NET header associated with the file in connection with determining whether the file is malicious (e.g., such as in response to determining that the file is a .NET file), and malicious file detector 170 uses .NET file parser to parse and/or extract information pertaining to the .NET file from the .NET header of the .NET file, etc. In some embodiments, .Net file parser 172 extracts the information from the .NET header in a sandbox environment of the system.

According to various embodiments, in response to prediction engine 176 determining that the file is malicious, the system sends to a security entity (or endpoint such as a client) an indication that the file is malicious. For example, malicious file detector 170 sends to a security entity (e.g., a firewall) or network node (e.g., a client) an indication that the file is malicious. The indication that the file is malicious may correspond to an update to a blacklist of file (e.g., corresponding to malicious file) such as in the case that the file is deemed to be malicious, or an update to a whitelist of file (e.g., corresponding to non-malicious file) such as in the case that the file is deemed to be benign. In some embodiments, malicious file detector 170 sends a hash or signature corresponding to the file in connection with the indication that the file is malicious or benign. The security entity or endpoint may compute a hash or signature for a file and perform a lookup against a mapping of hashes/signatures to indications of whether files are malicious/benign (e.g., query a whitelist and/or a blacklist). In some embodiments, the hash or signature uniquely identifies the file.

Cache 178 stores information pertaining to a file. In some embodiments, cache 178 stores mappings of indications of whether a file is malicious (or likely malicious) to particular files, or mappings of indications of whether a file is malicious (or likely malicious) to hashes or signatures corresponding to files. Cache 178 may store additional information pertaining to a set of files such as script information for files in the set of files, hashes or signatures corresponding to files in the set of files, other unique identifiers corresponding to files in the set of files, executables called by the files, bitcoin wallets called by the files, pointers comprised in the files, etc.

Returning to FIG. 1, suppose that a malicious individual (using system 120) has created malware 130. The malicious individual hopes that a client device, such as client device 104, will execute a copy of malware 130, compromising the client device, and causing the client device to become a bot in a botnet. The compromised client device can then be instructed to perform tasks (e.g., cryptocurrency mining, or participating in denial of service attacks) and/or to report information to an external entity (e.g., associated with such tasks, exfiltrate sensitive corporate data, etc.), such as command and control (C&C) server 150, as well as to receive instructions from C&C server 150, as applicable.

While malware 130 might attempt to cause the compromised client device to directly communicate with C&C server 150 (e.g., by causing the client to send an email to C&C server 150), such overt communication attempts could be flagged (e.g., by data appliance 102) as suspicious/harmful and blocked. Increasingly, instead of causing such direct communications to occur, malware authors use a technique referred to herein as DNS tunneling. DNS is a protocol that translates human-friendly URLs, such as paloaltonetworks.com, into machine-friendly IP addresses, such as 199.167.52.137. DNS tunneling exploits the DNS protocol to tunnel malware and other data through a client-server model. In an example attach, a malicious file (e.g., malware) is sent as an attachment to a message such as an email, an instant message, etc. Upon selecting the attachment, the malware program may be installed at the client device. In an example attack, the attacker registers a domain, such as badsite.com. The domain's name server points to the attacker's server, where a tunneling malware program is installed. The attacker infects a computer. Because DNS requests are traditionally allowed to move in and out of security appliances, the infected computer is allowed to send a query to the DNS resolver (e.g., to kj32hkjgfeuo32ylhkjshdflu23.badsite.com, where the subdomain portion of the query encodes information for consumption by the C&C server). The DNS resolver is a server that relays requests for IP addresses to root and top-level domain servers. The DNS resolver routes the query to the attacker's C&C server, where the tunneling program is installed. A connection is now established between the victim and the attacker through the DNS resolver. This tunnel can be used to exfiltrate data or for other malicious purposes.

Detecting and preventing DNS tunneling attacks is difficult for a variety of reasons. Many legitimate services (e.g., content delivery networks, web hosting companies, etc.) legitimately use the subdomain portion of a domain name to encode information to help support use of those legitimate services. The encoding patterns used by such legitimate services can vary widely among providers and benign subdomains can appear visually indistinguishable from malicious ones. A second reason is that, unlike other areas of (e.g., computer research) which have large corpuses of both known benign and known malicious training set data, training set data for DNS queries is heavily lopsided (e.g., with millions of benign root domain examples and very few malicious examples). Despite such difficulties, and using techniques described herein, malicious domains can efficiently and proactively be detected (e.g., shortly after registration of a domain), and security policies may be enforced with respect to malicious files within a network or entering a network, and to block such malicious files, or to otherwise alert a user or administrator of the malicious files (e.g., send a notification, provide a prompt to a user, etc.).

The environment shown in FIG. 1 includes three Domain Name System (DNS) servers (122-126). As shown, DNS server 122 is under the control of ACME (for use by computing assets located within network 110), while DNS server 124 is publicly accessible (and can also be used by computing assets located within network 110 as well as other devices, such as those located within other networks (e.g., networks 114 and 116)). DNS server 126 is publicly accessible but under the control of the malicious operator of C&C server 150. Enterprise DNS server 122 is configured to resolve enterprise domain names into IP addresses, and is further configured to communicate with one or more external DNS servers (e.g., DNS servers 124 and 126) to resolve domain names as applicable.

As mentioned above, in order to connect to a legitimate domain (e.g., www.example.com depicted as site 128), a client device, such as client device 104 will need to resolve the domain to a corresponding Internet Protocol (IP) address. One way such resolution can occur is for client device 104 to forward the request to DNS server 122 and/or 124 to resolve the domain. In response to receiving a valid IP address for the requested domain name, client device 104 can connect to website 128 using the IP address. Similarly, in order to connect to malicious C&C server 150, client device 104 will need to resolve the domain, "kj32hkjgfeuo32ylhkjshdflu23.badsite.com," to a corresponding Internet Protocol (IP) address. In this example, malicious DNS server 126 is authoritative for *.badsite.com and client device 104's request will be forwarded (for example) to DNS server 126 to resolve, ultimately allowing C&C server 150 to receive data from client device 104.

Data appliance 102 is configured to enforce policies regarding communications between client devices, such as client devices 104 and 106, and nodes outside of enterprise network 140 (e.g., reachable via external network 118). Examples of such policies include ones governing traffic shaping, quality of service, and routing of traffic. Other examples of policies include security policies such as ones requiring the scanning for threats in incoming (and/or outgoing) email attachments, website content, files exchanged through instant messaging programs, and/or other file transfers. In some embodiments, data appliance 102 is also configured to enforce policies with respect to traffic that stays within enterprise network 140.

In various embodiments, data appliance 102 includes a DNS module 134, which is configured to facilitate determining whether client devices (e.g., client devices 104-108) are attempting to engage in malicious DNS tunneling, and/or prevent connections (e.g., by client devices 104-108) to malicious DNS servers. DNS module 134 can be integrated into appliance 102 (as shown in FIG. 1) and can also operate as a standalone appliance in various embodiments. And, as with other components shown in FIG. 1, DNS module 134 can be provided by the same entity that provides appliance 102 (or security platform 140), and can also be provided by a third party (e.g., one that is different from the provider of appliance 102 or security platform 140). Further, in addition to preventing connections to malicious DNS servers, DNS module 134 can take other actions, such as individualized logging of tunneling attempts made by clients (an indication that a given client is compromised and should be quarantined, or otherwise investigated by an administrator).

In various embodiments, when a client device (e.g., client device 104) attempts to resolve a domain, DNS module 134 uses the domain as a query to security platform 140. This query can be performed concurrently with resolution of the domain (e.g., with the request sent to DNS servers 122, 124, and/or 126 as well as security platform 140). As one example, DNS module 134 can send a query (e.g., in the JSON format) to a frontend 142 of security platform 140 via a REST API. Using processing described in more detail below, security platform 140 will determine (e.g., using DNS tunneling detector 138) whether the queried domain indicates a malicious DNS tunneling attempt and provide a result back to DNS module 134 (e.g., "malicious DNS tunneling" or "non-tunneling").

In various embodiments, when a client device (e.g., client device 104) attempts to open a file that was received, such as via an attachment to an email, instant message, or otherwise exchanged via a network, or when a client device receives such a file, DNS module 134 uses the file (or a computed hash or signature, or other unique identifier, etc.) as a query to security platform 140. This query can be performed contemporaneously with receipt of the file, or in response to a request from a user to scan the file. As one example, data appliance 102 can send a query (e.g., in the JSON format) to a frontend 142 of security platform 140 via a REST API. Using processing described in more detail below, security platform 140 will determine (e.g., using malicious file detector 170) whether the queried file is a malicious file (or likely to be a malicious file) and provide a result back to DNS module 134 (e.g., "malicious DNS tunneling" or "non-tunneling").

In various embodiments, DNS tunneling detector 138 (whether implemented on security platform 140, on data appliance 102, or other appropriate location/combinations of locations) uses a two-pronged approach in identifying malicious DNS tunneling. The first approach uses anomaly detector 146 (e.g., implemented using python) to build a set of real-time profiles (156) of DNS traffic for root domains. The second approach uses signature generation and matching (also referred to herein as similarity detection, and, e.g., implemented using Go). The two approaches are complementary. The anomaly detector serves as a generic detector that can identify previously unknown tunneling traffic. However, the anomaly detector may need to observe multiple DNS queries before detection can take place. In order to block the first DNS tunneling packet, similarity detector 144 complements anomaly detector 146 and extracts signatures from detected tunneling traffic which can be used to identify situations where an attacker has registered new malicious tunneling root domains but has done so using tools/malware that is similar to the detected root domains.

As data appliance 102 receives DNS queries (e.g., from DNS module 134), data appliance 102 provides them to security platform 140 which performs both anomaly detection and similarity detection, respectively. In various embodiments, a domain (e.g., as provided in a query received by security platform 140) is classified as a malicious DNS tunneling root domain if either detector flags the domain.

DNS tunneling detector 138 maintains a set of fully qualified domain names (FQDNs), per appliance (from which the data is received), grouped in terms of their root domains (illustrated collectively in FIG. 1 as domain profiles 156). (Though grouping by root domain is generally described in the Specification, it is to be understood that the techniques described herein can also be extended to arbitrary levels of domains.) In various embodiments, information about the received queries for a given domain is persisted in the profile for a fixed amount of time (e.g., a sliding time window of ten minutes).

As one example, DNS query information received from data appliance 102 for various foo.com sites is grouped (into a domain profile for the root domain foo.com) as: G(foo.com)=[mail.foo.com, coolstuff.foo.com, domain1234.foo.com]. A second root domain would have a second profile with similar applicable information (e.g., G(baddomain.com)=[lskjdf23r.baddomain.com, kj235hdssd233.baddomain.com]. Each root domain (e.g., foo.com or baddomain.com) is modeled using a set of characteristics unique to malicious DNS tunneling, so that even though benign DNS patterns are diverse (e.g., k2jh3i8y35.legitimatesite.com, xxx888222000444.otherlegitimatesite.com), they are highly unlikely to be misclassified as malicious tunneling. The following are example characteristics that can be extracted as features (e.g., into a feature vector) for a given group of domains (i.e., sharing a root domain).

In some embodiments, malicious file detector 170 provides to a security entity, such as data appliance 102, an indication whether a file is malicious. For example, in response to determining that the file is malicious, malicious file detector 170 sends an indication that the file is malicious to data appliance 102, and the data appliance may in turn enforce one or more security policies based at least in part on the indication that the file is malicious. The one or more security policies may include isolating the file, deleting the file, alerting or prompting the user of the maliciousness of the file prior to the user opening/executing the file, etc. As another example, in response to determining that the file is malicious, malicious file detector 170 provides to the security entity an update of a mapping of files (or hashes, signatures, Unmanaged Imphashes, or other unique identifiers corresponding to files) to indications of whether a corresponding file is malicious, or an update to a blacklist for malicious files (e.g., identifying files domains) or a whitelist for benign files (e.g., identifying files that are not deemed malicious).

Figure 2:
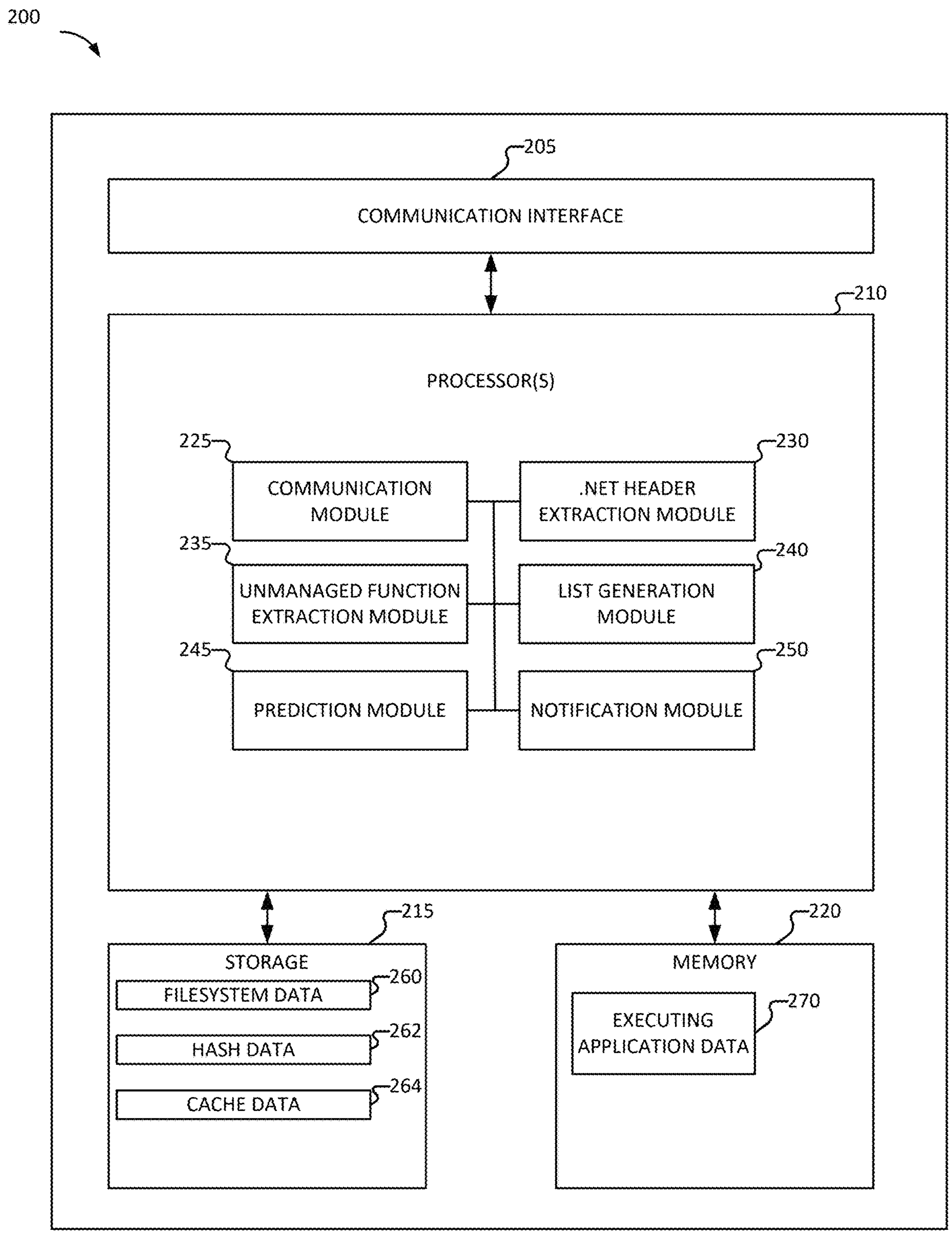
FIG. 2 is a block diagram of a system to detect a malicious file according to various embodiments.

FIG. 2 is a block diagram of a system to detect a malicious file according to various embodiments. According to various embodiments, system 200 is implemented in connection with system 100 of FIG. 1, such as for malicious file detector 170. In various embodiments, system 200 is implemented in connection with process 400 of FIG. 4, process 500 of FIG. 5, process 600 of FIG. 6, process 700 of FIG. 7A, process 750 of FIG. 7B, process 800 of FIG. 8, process 900 of FIG. 9, process 1000 of FIG. 10, and/or process 1100 of FIG. 11. System 200 may be implemented in one or more servers, a security entity such as a firewall, and/or an endpoint.

System 200 can be implemented by one or more devices such as servers. System 200 can be implemented at various locations on a network. In some embodiments, system 200 implements malicious file detector 170 of system 100 of FIG. 1. As an example, system 200 is deployed as a service, such as a web service (e.g., system 200 determines whether a file is malicious, and provides such determinations as a service). The service may be provided by one or more servers (e.g., system 200 or the malicious file detector is deployed on a remote server that monitors or receives files that are transmitted within or into/out of a network such as via attachments to emails, instant messages, etc., and determines whether a file is malicious, and sends/pushes out notifications or updates pertaining to the file such as an indication whether a file is malicious). As another example, the malicious file detector is deployed on a firewall.

In the example shown, system 200 implements one or more modules in connection with predicting whether a file (e.g., a newly received file) is malicious, determining a likelihood that the file is malicious, and/or providing a notice or indication of whether a file is malicious. System 200 comprises communication interface 205, one or more processors 210, storage 215, and/or memory 220. One or more processors 210 comprises one or more of communication module 225, .NET header extraction module 230, unmanaged function extraction module 235, list generation module 240, prediction module 245, and/or notification module 250.

In some embodiments, system 200 comprises communication module 225. System 200 uses communication module 225 to communicate with various nodes or end points (e.g., client terminals, firewalls, DNS resolvers, data appliances, other security entities, etc.) or user systems such as an administrator system. For example, communication module 225 provides to communication interface 205 information that is to be communicated. As another example, communication interface 205 provides to communication module 225 information received by system 200. Communication module 225 is configured to receive files to be analyzed, such as from network endpoints or nodes such as security entities (e.g., firewalls), etc. Communication module 225 is configured to query third party service(s) for information pertaining to files (e.g., services that expose information for files such as an third party scores or assessments of maliciousness of files, a community-based score, assessment, or reputation pertaining to files, a blacklist for files, and/or a whitelist for files, etc.). For example, system 200 uses communication module 225 to query the third party service(s). Communication module 225 is configured to receive one or more settings or configurations from an administrator. Examples of the one or more settings or configurations include configurations of a process determining whether a file is malicious, a format according to which information of a .NET file is to be organized/arranged in order to determine an Unmanaged Imphash for the .NET file, a hashing function to be used in connection with determining the Unmanaged Imphash for files, information pertaining to a whitelist of domains (e.g., domains that are not deemed suspicious and for which traffic or attachments are permitted), information pertaining to a blacklist of domains (e.g., domains that are deemed suspicious and for which traffic or attachments are to be restricted).

In some embodiments, system 200 comprises .NET header extraction module 230. System 200 uses .NET header extraction module 230 in connection with determining whether to extract information pertaining to (e.g., from) a header for a file, and with extracting information for a file (e.g., for analysis of whether the file is malicious). In some embodiments, .NET header extraction module 230 receives files to be analyzed such as files that are included as attachments to emails, instant messages, or that otherwise are communicated across or into/out of a network. .NET header extraction module 230 determines to perform an extraction of information pertaining to a header for a file in response to determining that the file is a .NET file. As an example, .NET header extraction module 230 determines that the file is a .NET file based on receiving an indication that the file corresponds to a .NET file. As another example, .NET header extraction module 230 determines that the file is a .NET file based at least in part on determination that the file comprises a .NET header. As another example, .NET header extraction module 230 determines that the file is a .NET file based at least in part on a determination that the directory item in the PE header has non-zero values (e.g., system 200 examines the binary structure of the file and determines whether values in the optional header value comprises non-zero values/locations, and if so, then determines that the file is a .NET file). As another example, .NET header extraction module 230 determines that the files is a .NET file based at least in part on checking to determine if the file imports the "_CorExeMain" or "_CorDllMain" function.

In some embodiments, .NET header extraction module 230 obtains a .NET header and/or information from the .NET header of the .NET file. In response to determining that the file is a .NET file, .NET header extraction module 230 obtains information pertaining to (e.g., from) a header for a file. In some embodiments, .NET header extraction module 230 determines the .NET header and obtains imported functions that are imported (or referenced by) the .NET header. For example, the .NET header extraction module 230 obtains imported API function names based at least in part on a .NET header of the .NET file. The .NET header extraction module 230 obtains one or more data streams comprised in the .NET header and/or one or more tables comprised in (or referenced by) the .NET header. For example, the .NET header extraction module 230 obtains the #Strings stream comprised in the .NET header. As another example, the .NET header extraction module 230 obtains the ImplMap from the .NET file (e.g., from the .NET header). The ImplMap may include various information about any imported unmanaged functions of the .NET file. In some embodiments, the .NET header extraction module 230 determines a set of imported functions (e.g., imported API function names) that are imported to the .NET file.

According to various embodiments, in response to receiving the file to be analyzed to determine whether the file is malicious, system 200 places the file in a sandbox in which the file is to be analyzed. In some embodiments, .NET header extraction module 230 extracts information pertaining to (e.g., from) a header for a file. As an example, .NET header extraction module 230 extracts header information from the .NET header and/or the PE header for the .NET file in the sandbox. For example, system 200 invokes a sandbox for analysis of a particular file. As another example, system 200 uses a common sandbox for analysis of various files.

In some embodiments, system 200 comprises unmanaged function extraction module 235. System 200 uses unmanaged function extraction module 235 to determine (e.g., obtain) a set of unmanaged functions comprised in, or referenced by, the .NET file, such as a list of unmanaged functions imported via the .NET header of the .NET file. For example, unmanaged function extraction module 235 determines the set of unmanaged imported functions from the set of imported functions (e.g., imported API function names) that are imported to the .NET file. According to various embodiments, unmanaged function extraction module 235 uses information comprised in (or referenced by) the .NET header to determine unmanaged code or an unmanaged function (e.g., the unmanaged function and corresponding library). In some embodiments, the unmanaged function extraction module 235 determines a set of used unmanaged win32 API functions imported to the .NET file. Unmanaged function extraction module 235 provides the set of unmanaged imported functions (or names of the unmanaged functions) and/or corresponding libraries that are imported to the .NET file to list generation module 240 and/or prediction module 245.

In some embodiments, system 200 comprises list generation module 240. System 200 uses list generation module 240 to generate a list of unmanaged functions and/or corresponding libraries. In some embodiments, system 200 uses list generation module 240 to format the set of unmanaged imported functions (or names of the unmanaged functions) and/or corresponding libraries that are imported to the .NET file. List generation module 240 formats the list and/or unmanaged functions (e.g., unmanaged function names and/or corresponding libraries) according to a predetermined format. Examples of the predetermined format include (i)

lower case alphanumeric strings, (ii) removal of file extensions, (iii) removal of library extensions (e.g., removal of .dll from the corresponding library name), (iv) appending an unmanaged function name and corresponding library, and (v) use of a predefined separator between the unmanaged function name and corresponding library. In some embodiments, list generation module 240 appends a function name (e.g., unmanaged function name) to the corresponding library, and separates the function name from the corresponding library by a dot or period (e.g., "."). In response to determining a string by appending the function name and library (e.g., with the predefined separator such as "."), list generation module 240 adds such entry to the list of the set of unmanaged imported functions and/or corresponding libraries. According to various embodiments, in response to determining that no further unmanaged functions and/or corresponding libraries are to be added to the list, list generation module 240 provides the list of prediction module 245.

In some embodiments, system 200 comprises prediction module 245. System 200 uses prediction module 245 to predict whether a file is malicious, or to predict a likelihood that the file is malicious. According to various embodiments, prediction module 245 determines whether the file is malicious based at least in part on information comprised (or referenced by) the .NET header of the file. For example, prediction module 245 determines an Unmanaged Imphash corresponding to the file, and determines whether the file is malicious based at least in part on the Unmanaged Imphash.

According to various embodiments, prediction module 245 determines a hash with respect to the list of the set of unmanaged imported functions and/or corresponding libraries. Various hash functions may be used in connection with determining the hash. Examples of the hashing function include a SHA-256 hashing function, an MD5 hashing function, an SHA-1 hashing function, etc. Various other hashing functions may be implemented. Prediction module 245 uses the hashing function to determine the Unmanaged Imphash corresponding to the .NET file.

According to various embodiments, prediction module 245 uses information obtained from the .NET header of the .NET file to determine whether the .NET file is malicious. In some embodiments, prediction module 245 uses the Unmanaged Imphash corresponding to the .NET file in connection determining whether the .NET file is malicious. As an example, in response to determining the Unmanaged Imphash corresponding to the .NET file, prediction module 245 determines whether the Unmanaged Imphash matches an Unmanaged Imphash for a file deemed to be malicious. As an example, in response to determining the Unmanaged Imphash corresponding to the .NET file, prediction module 245 determines whether the Unmanaged Imphash matches an Unmanaged Imphash for a file that is deemed to be benign. In some embodiments, prediction module 245 determines whether information pertaining to a particular file (e.g., the Unmanaged Imphash corresponding to a .NET file being analyzed) is comprised in a dataset of historical files and historical information associated with the historical dataset indicating whether a particular file is malicious (e.g., a third party service such as VirusTotal™). In response to determining that information pertaining to a particular file is not comprised in, or available in, dataset of historical files and historical information, prediction module 245 may deem the file to be benign (e.g., deem the file to not be malicious). An example of the historical information associated with the historical files indicating whether a particular files is malicious corresponds to a VirusTotal® (VT) score. In the case of a VT score greater than 0 for a particular file, the particular file is deemed malicious by the third party service. In some embodiments, the historical information associated with the historical file indicating whether a particular file is malicious corresponds to a social score such as a community-based score or rating (e.g., a reputation score) indicating that a file is malicious or likely to be malicious. The historical information (e.g., from a third party service, a community-based score, etc.) indicates whether other vendors or cyber security organizations deem the particular file to be malicious.

System 200 may determine (e.g., compute) a hash or signature corresponding to the file (e.g., an Unmanaged Imphash) and perform a lookup against the historical information (e.g., a whitelist, a blacklist, etc.). In some implementations, prediction module 245 corresponds to, or is similar to, prediction engine 176. System 200 (e.g., prediction module 245) may query, via communication interface 205, a third party (e.g., a third party service) for historical information pertaining to files (or a set of files or hashes/signatures for files previously deemed to be malicious or benign). System 200 (e.g., prediction module 245) may query the third party at predetermined intervals (e.g., customer-specified intervals, etc.). As an example, prediction module 245 may query the third party for registration information for newly analyzed files daily (or daily during the business week).

In some embodiments, system 200 comprises notification module 250. System 200 uses notification module 250 to provide an indication of whether the file is malicious. For example, notification module 250 obtains an indication of whether the file is malicious (or a likelihood that the file is malicious) from prediction module 245 and provides the indication of whether the file is malicious to one or more security entities and/or one or more endpoints. As another example, notification module 250 provides to one or more security entities (e.g., a firewall), nodes, or endpoints (e.g., a client terminal) an update to a whitelist of files and/or blacklist of files. According to various embodiments, notification module 250 obtains a hash, signature, or other unique identifier associated with the file (e.g., an Unmanaged Imphash corresponding to the file), and provides the indication of whether the file is malicious in connection with the hash, signature, or other unique identifier associated with the file.

According to various embodiments, the hash of a file corresponds to a hash using a predetermined hashing function (e.g., an Unmanaged Imphash using an MD5 hashing function, an MD5 hash of the file, etc.). A security entity or an endpoint may compute a hash of a received file (e.g., a file attachment, etc.). The security entity or an endpoint may determine whether the computed hash corresponding to the file is comprised within a set such as a whitelist of benign files, and/or a blacklist of malicious files, etc. If a signature for malware (e.g., the hash of the received file) is included in the set of signatures for malicious files (e.g., a blacklist of malicious files), security entity or an endpoint can prevent the transmission of malware to an endpoint (e.g., a client device) and/or prevent an opening or execution of the malware accordingly.

According to various embodiments, storage 215 comprises one or more of filesystem data 260, hash data 262, and/or cache data 264. Storage 215 comprises a shared storage (e.g., a network storage system) and/or database data, and/or user activity data.

In some embodiments, filesystem data 260 comprises a database such as one or more datasets (e.g., one or more datasets for files and/or file attributes, mappings of indicators of maliciousness to files or hashes, Unmanaged Imphashes, signatures or other unique identifiers of files, mappings of indicators of benign files to files or hashes, signature or other unique identifiers of files, etc.). Filesystem data 260 comprises data such as historical information pertaining files (e.g., maliciousness of files), a whitelist of files deemed to be safe (e.g., not suspicious), a blacklist of files deemed to be suspicious or malicious (e.g., files for which a deemed likelihood of maliciousness exceeds a predetermined/preset likelihood threshold), information associated with suspicious or malicious files, etc.

Hash data 262 comprises data pertaining to one or more files such as hash values pertaining to one or more files. In some embodiments, hash data 262 comprises Unmanaged Imphashes for files such as files that are analyzed by system 200 to determine whether such files are malicious, or a historical dataset that have been previously assessed for maliciousness such as by a third party. Hash data 262 includes a mapping of hash values (Unmanaged Imphashes) to indications of maliciousness (e.g., an indication that the corresponding is malicious or benign, etc.). In some embodiments, hash data 262 comprises relationships and associations between files or information pertaining to files (e.g., scripts, attributes such as bytes, structure, etc.) and indications or likelihoods that the files are malicious or benign. For example, hash data 262 includes a mapping of hash values (Unmanaged Imphashes) to indications of maliciousness (e.g., an indication that the corresponding is malicious or benign, etc.).

Cache data 264 comprises information pertaining to predictions of whether a file is malicious. As an example, predictive cache data 264 stores indications of whether one or more files are malicious.

According to various embodiments, memory 220 comprises executing application data 270. Executing application data 270 comprises data obtained or used in connection with executing an application such as an application executing a hashing function or an application to extract information from a file. In embodiments, the application comprises one or more applications that perform one or more of receive and/or execute a query or task, generate a report and/or configure information that is responsive to an executed query or task, and/or to provide to a user information that is responsive to a query or task. Other applications comprise any other appropriate applications (e.g., an index maintenance application, a communications application, a machine learning model application, an application for detecting suspicious traffic, a document preparation application, a report preparation application, a user interface application, a data analysis application, an anomaly detection application, a user authentication application, a security policy management/update application, etc.).

FIG. 3A is an illustration of an ImplMap table of a .NET header for an example .NET file. In the table 300 illustrated in FIG. 3A, an ImplMap table of a 32-bit DLL sample is provided. In some embodiments, the ImplMap table for a sample is obtained by inputting the 32-bit DLL sample to a debugger and/or .NET assembly editor. An example of such a debugger and/or .NET assembly editor is dnSpy. Various other debuggers and/or .NET assembly editors may be implemented.

According to various embodiments, the system determines an index to the #Strings stream based at least in part on ImplMap table. In some embodiments, the index to the #Strings stream corresponds to the ImportName table. The #Strings stream generally corresponds to an array of null-terminated strings in which most of the strings of the .NET file reside. System determines the index to the #Strings stream using the column labeled ImportName. The name of the function can be determined using the index value from the ImportName column. In table 300 the name of the function corresponding to the value of the ImportName is provided in the Info column.

In response to determining the index value from the ImportName and/or the function name for the imported function, the system determines the library name for the corresponding library (e.g., the DLL). In some embodiments, the system determines the library (e.g., the library name) based at least in part on the ModuleRef table of the .NET file.

FIG. 3B is an illustration of a ModuleRef table of an example .NET file. In the table 310 illustrated in FIG. 3B, a ModuleRef table of the 32-bit DLL sample analyzed with respect to table 300 of FIG. 3A is provided. In some embodiments, the ModuleRef table for a sample is obtained by inputting the 32-bit DLL sample to a debugger and/or .NET assembly editor.

According to various embodiments, the system uses the index value from the ImportName field (e.g., column) of the ImplMap table as an index to determine a corresponding library (e.g., library name). The system uses the index value as a lookup in the Name column of table 310. For example, the Name column is an index to the #Strings stream. The info column of the ModuleRef table comprises an indication of the field. For example, the library name corresponding to the index value 0x18F3 in the Name column is kernel32.dll.

In connection with determining an Unmanaged Imphash corresponding to a .NET file, the system determines a list of unmanaged functions. The list of unmanaged functions is generated using a predetermined format or syntax. For example, the system obtains the library name corresponding to an imported function and removes the extension. The system determines whether the library has a ".dll" extension and if so, the system removes the extension. As another example, the system formats the function names and the library names to convert any uppercase letters to lowercase letters. In some embodiments, the system builds a string that corresponds to a combination of the function name for an imported function (e.g., an unmanaged imported function) and a library name corresponding to the imported function. For example, the system builds the string in a manner that appends the library name to the function name, and a predefined separator (e.g., ".") is included between the library name and the function name. According to various embodiments, the system determines the string according to the format: <LibraryName>.<FunctionName>. The system then adds the string to a list of unmanaged imported functions (e.g., a list for which the Unmanaged Imphash is determined).

Using the example sample corresponding to table 300 of FIG. 3A and table 310 of FIG. 3B, the list of library-function name pairs is: kernel32.createprocess, kernel32.getthreadcontext, kernel32.wow64getthreadcontext, kernel32.setthreadcontext, kernel32.wow64setthreadcontext, kernel32.readprocessmemory, kernel32.writeprocessmemory, ntdll.ntunmapviewofsection, kernel32.virtualallocex, kernel32.resumethread, kernel32.loadlibrary, kernel32.getprocaddress. Entries in the list may be separated by a predetermined separator, such as a comma, a semicolon, a colon, etc.

According to various embodiments, in response to determining the list of unmanaged imported functions for the .NET file, the system performs a hashing of the list using a predetermined hashing function (e.g., MD5, SHA1, SHA-256, etc.). As an example, the Unmanaged Imphash for the list of unmanaged imported function using the sample analyzed in table 300 of FIG. 3A and table 310 of FIG. 3B is (using SHA-256 as the hashing function): 4b386faf53783c4fd17de6c043fd31374302a4455456b4af3d78abd74c865ff8.

FIG. 3C is an illustration of an ImplMap table of a .NET header for an example .NET file. In the table 320 illustrated in FIG. 3C, an ImplMap table of a 32-bit EXE sample is provided. The 32-bit EXE was created using a Visual C++ compiler and the C++/CLI extension. In some embodiments, the ImplMap table for a sample is obtained by inputting the 32-bit DLL sample to a debugger and/or .NET assembly editor. An example of such a debugger and/or .NET assembly editor is dnSpy. Various other debuggers and/or .NET assembly editors may be implemented.

As illustrated in FIG. 3C, the first three rows of table 320 have a value comprised in the Info column. Accordingly, for the first three rows, the process described in connection with table 300 of FIG. 3A and table 310 of FIG. 3B to determine the function name and corresponding library name may be performed (e.g., to determine the library-function name pairs). However, the remaining rows of the ImplMap table of FIG. 3C has a null value or 0. The null value or zero entries in the remaining rows may result because the corresponding functions are not used by the sample author, but instead are part of the C++/CLI created runtime methods used internally. In some embodiments, the system determines the function name and library name based on the MethodDef table for the file. For example, the system uses values included in the MethodForward column of the ImplMap table (e.g., table 320) as an index to the MethodDef table. As an example, the MemberForward value is referred to as a coded index into the MethodDef table (e.g., the coded index is defined in the .NET specification ECMA-335).

According to various embodiments, the system obtains the values from the remaining rows of MethodForward column of the ImplMap table of FIG. 3C, decodes the values obtained from the MethodForward column, and uses the decoded value as an index to the MethodDef table. As an example, the value from the 4th row of the MemberForward column is 0x99, which is decoded to correspond to 76. Accordingly, 76 is used as the index value to determine information from the MethodDef table.

FIG. 3D is an illustration of a MethodDef table for an example .NET file. In the table 330 illustrated in FIG. 3D, a MethodDef table of the sample analyzed with respect to table 320 of FIG. 3C is provided. In some embodiments, the MethodDef table for a sample is obtained by inputting the sample to a debugger and/or .NET assembly editor.

Using the index value obtained from the MethodForward column of the ImplMap, the system determines an index to the #Strings stream. For example, the system uses the index value obtained from the MethodForward column of the ImplMap as a lookup in the Name column of the MethodDef table. The index value in the Name column corresponding to the index 76 from the MethodForward column is 0x1831. As illustrated in table 330, the Info column of the MethodDef table indicates that the function name is _amsg_exit.

FIG. 3E is an illustration of a ModuleRef table for an example .NET file. In the table 340 illustrated in FIG. 3E, a ModuleRef table of the sample analyzed with respect to table 320 of FIG. 3C is provided. In some embodiments, the ModuleRef table for a sample is obtained by inputting the sample to a debugger and/or .NET assembly editor.

According to various embodiments, the system determines the library name in response to determining the function name (e.g., the function name obtained from the MethodDef table). For examples, the system performs a lookup in the ImplMap table (e.g., table 320 in FIG. 3C) and determines that the value in the ImportScope column is 2 for the remaining rows. The system uses the index value 2 from the ImportScope column as an index for the ModuleRef table. In response to performing a lookup in the ModuleRef table (e.g., table 340) using the index value 2 (e.g., from the ImportScope column of the ImplMap table), the system determines that the value in the Name column is also 0. Thus, the system determines that the ModuleRef does not provide an indication of the library names.

According to various embodiments, in response to determining that ModuleRef does not provide an indication of the library names corresponding to a function, the system determines to use the retrieved function names from the MethodDef table and parse the import table in the PE header. The import table in the PE header comprises all statically used functions of the file with their corresponding library names where the statically used functions reside (DLLs). For example, the system uses a PE header parser to parse the import table in the PE header. An example of a PE header parser is pefile (e.g., an open-source project called pefile), which is a PE header parser coded in Python. In some embodiments, the system performs a 1:1 comparison of the function name obtained from the MethodDef table and the function in the import table of the PE header. As an example, files that are written in C++(like mixed assemblies) can have so called decorated names as function names in the import table. The process of creating these names is known as name mangling. Such decorated function names are created by the C++ compiler automatically for every C++ function, except when the function is defined as extern "C".

Figure 3F:
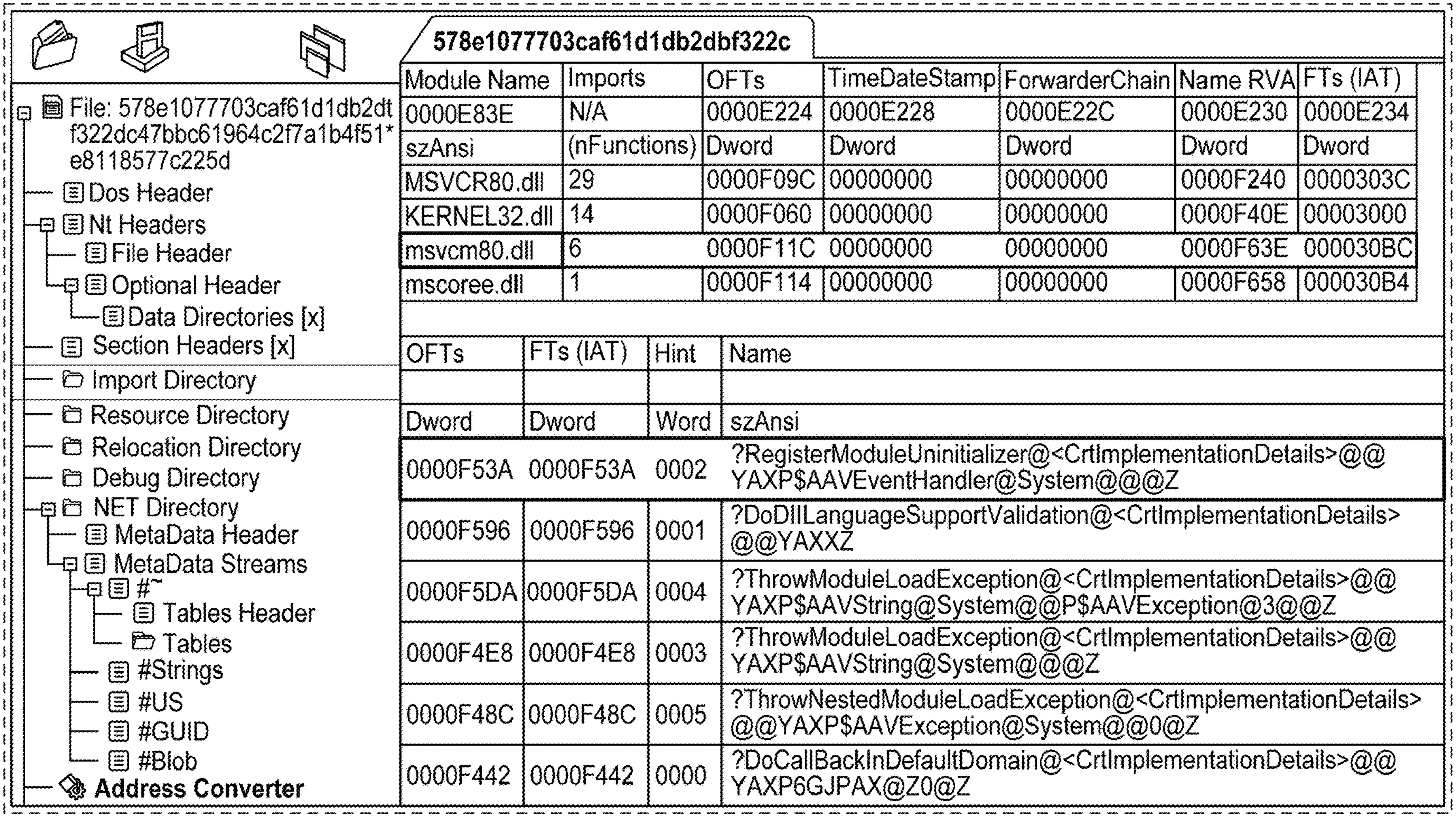
FIG. 3F is an illustration of an Import table for an example .NET file.

FIG. 3F is an illustration of an Import table for an example .NET file. In the example shown in FIG. 3F, table 350 is an import table comprised in the PE header of the .NET file.

FIG. 3G is an illustration of a MethodDef table for an example .NET file. In the example shown, table 360 is the MethodDef table for the .NET file. In some embodiments, in response to the system determining that a function name obtained from the MethodDef table matches a function name in the import table comprised in the PE header, the system obtains the corresponding library name from the import table. According to various embodiments, the system performs the lookup of for matching function names between the MethodDef and the import table comprised in the PE header to obtain corresponding library names.

In connection with determining an Unmanaged Imphash corresponding to a .NET file, the system determines a list of unmanaged functions. The list of unmanaged functions is generated using a predetermined format or syntax. For example, the system obtains the library name corresponding to an imported function and removes the extension. The system determines whether the library has a ".dll" extension and if so, the system removes the extension. As another example, the system formats the function names and the library names to convert any uppercase letters to lowercase letters. In some embodiments, the system builds a string that corresponds to a combination of the function name for an imported function (e.g., an unmanaged imported function) and a library name corresponding to the imported function. For example, the system builds the string in a manner that appends the library name to the function name, and a predefined separator (e.g., ".") is included between the library name and the function name. According to various embodiments, the system determines the string according to the format: <LibraryName>.<FunctionName>. The system then adds the string to a list of unmanaged imported functions (e.g., a list for which the Unmanaged Imphash is determined).

Using the example sample corresponding to table 300 of FIG. 3A and table 310 of FIG. 3B, the list of library-function name pairs is: ntdll.zwallocatevirtualmemory, ntdll.zwfreevirtualmemory, ntdll.ldrgetprocedureaddress, msvcr80._amsg_exit, kernel32.sleep, .<crtimplementationdetails>.throwmoduleloadexception, .<crtimplementationdetails>.throwmoduleloadexception, .<crtimplementationdetails>.dodlllanguagesupport validation, .<crtimplementationdetails>.thrownestedmoduleload exception, .<crtimplementationdetails>.registermoduleuninitializer, .<crtimplementationdetails>.docallbackindefaultdomain, msvcr80._cexit, msvcr80._encode_pointer, msvcr80._decode_pointer, msvcr80._encoded_null, msvcr80._frameunwindfilter. Entries in the list may be separated by a predetermined separator, such as a comma, a semicolon, a colon, etc. The library-function pair .<crtimplementationdetails>.throwmoduleloadexception is included twice because the function is a so-called overloaded function. Such functions have the same name but differ in their parameter types, numbers or return values. Therefore, these are different functions.

According to various embodiments, in response to determining the list of unmanaged imported functions for the .NET file, the system performs a hashing of the list using a predetermined hashing function (e.g., MD5, SHA1, SHA-256, etc.). As an example, the Unmanaged Imphash for the list of unmanaged imported function using the sample analyzed in table 300 of FIG. 3A and table 310 of FIG. 3B is (using SHA-256 as the hashing function): cd2f27b642a85c3f0c10db4e887d504d3b4c0882f92649943 67c0c9b4ea7a537.

In some embodiments, the system transform or formats the list according to a predefined format. For example, the list of library<->function(<->mappingflags) name pairs get transformed into a comma separated string. The system create a comma separated string with the single list items (library<->function pairs). In response to transforming/creating the comma separated string with the single list items, the system determines (e.g., computes the hash) with respect to such string.

Figure 4:
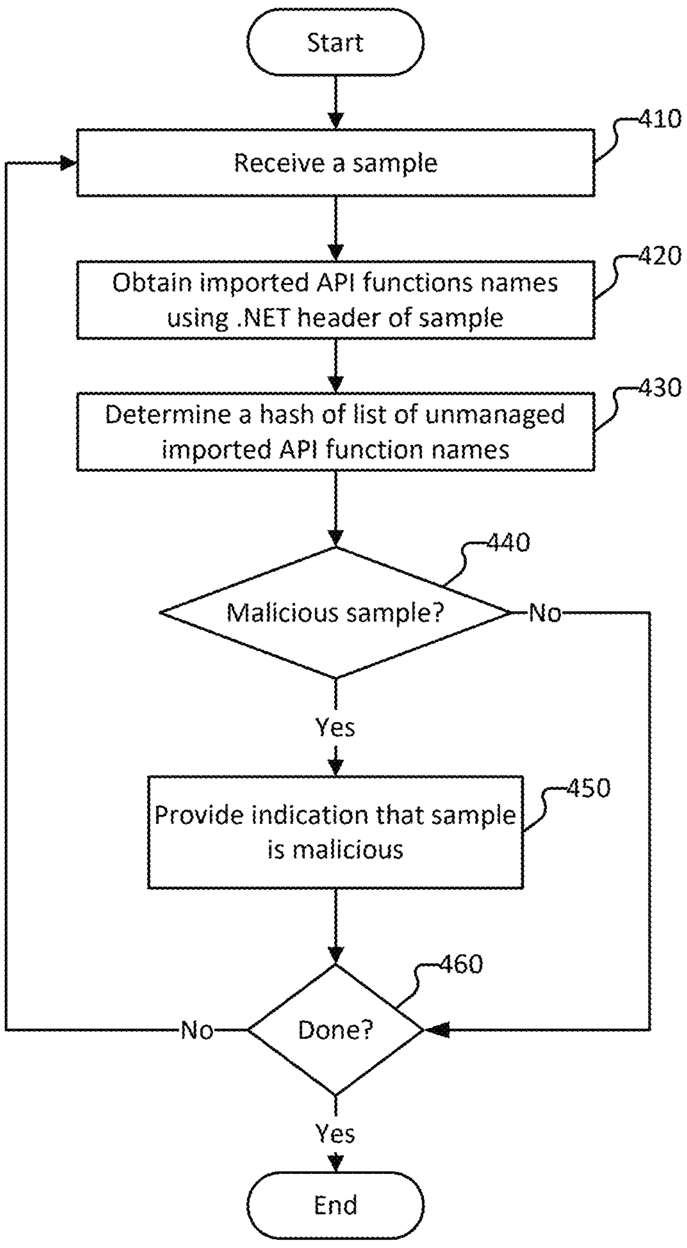
FIG. 4 is a flow diagram of a method for detecting a malicious file according to various embodiments.

FIG. 4 is a flow diagram of a method for detecting a malicious file according to various embodiments. In some embodiments, process 400 is implemented at least in part on by system 100 of FIG. 1 and/or system 200 of FIG. 2. In some implementations, process 400 may be implemented by one or more servers, such as in connection with providing a service to a network (e.g., a security entity and/or a network endpoint such as a client device). In some implementations, process 400 may be implemented by a security entity (e.g., a firewall) such as in connection with enforcing a security policy with respect to files communicated across a network or in/out of the network. In some implementations, process 400 may be implemented by a client device such as a laptop, a smartphone, a personal computer, etc., such as in connection with executing or opening a file such as an email attachment.

At 410, a sample is received. In some embodiments, the system receives a sample (e.g., a .NET file) from a security entity (e.g., a firewall), an endpoint (e.g., a client device), etc. For example, in response to determining that a file is attached to a communication such as an email or an instant message, the security entity or endpoint provides (e.g., sends) the file to the system. The sample may be received in connection with a request to determine whether the file is malicious.

In the case that process 400 is implemented by a security entity, the sample may be received such as in connection with routing traffic to an applicable network endpoint (e.g., a firewall obtains the sample from an email attachment for an email directed to a client device). In the case that process 400 is implemented by a client device, the sample may be received by an application or layer monitoring incoming/outgoing information. For example, a process (e.g., an application, an operating system process, etc.) may run in the background to monitor and obtain email attachments, files exchanged over an instant messaging program, etc.

At 420, imported API function names are obtained using a .NET header of the sample. In some embodiments, in response to receiving the sample and/or a request to assess whether the sample (e.g., the .NET file) is malicious, the system parses the sample to obtain information pertaining (e.g., comprised in) the .NET header of the sample.

According to various embodiments, the system determines the .NET header and obtains imported functions that are imported (or referenced by) the .NET header. For example, the system obtains imported API function names based at least in part on a .NET header of the .NET file. The system obtains one or more data streams comprised in the .NET header and/or one or more tables comprised in (or referenced by) the .NET header. For example, the system obtains the #Strings stream comprised in the .NET header. As another example, the system obtains the ImplMap from the .NET file (e.g., from the .NET header). The ImplMap may include various information about any imported unmanaged functions of the .NET file. In some embodiments, the system determines a set of imported functions (e.g., imported API function names) that are imported to the .NET file.

In some embodiments, the system determines (e.g., obtain) a set of unmanaged functions comprised in, or referenced by, the .NET file, such as a list of unmanaged functions imported via the .NET header of the .NET file. For example, the system determines the set of unmanaged imported functions from the set of imported functions (e.g., imported API function names) that are imported to the .NET file. The system uses information comprised in (or referenced by) the .NET header to determine unmanaged code or an unmanaged function (e.g., the unmanaged function and corresponding library). In some embodiments, the system determines a set of used unmanaged win32 API functions imported to the .NET file.

At 430, a hash of a list of unmanaged imported API function names is determined. In some embodiments, in response to obtaining the imported API function names, the system determines (e.g., computes) hash of a list of unmanaged imported API function names. For example, the system computes the Unmanaged Imphash corresponding to the .NET file.

In connection with determining a hash of a list of unmanaged imported API function names, the system determines a list of the set of unmanaged imported functions (or names of the unmanaged functions) and/or corresponding libraries that are imported to the .NET file, and determines the hash of such list. The list of the set of unmanaged imported functions and/or corresponding libraries is determined according to a predetermined order. For example, an ordering of the unmanaged imported functions and/or corresponding libraries corresponds to an order in which the unmanaged functions are comprised in an element of the .NET header (e.g., an order in which the unmanaged functions are comprised in the #Strings stream and/or table comprised in, or referenced by, the .NET table). Various other orders in which unmanaged functions are added to the list (or in which the list is arranged) may be implemented. The system formats the list and/or unmanaged functions (e.g., unmanaged function names and/or corresponding libraries) according to a predetermined format or syntax. Examples of the predetermined format include (i) lower case alphanumeric strings, (ii) removal of file extensions, (iii) removal of library extensions (e.g., removal of .dll from the corresponding library name), (iv) appending an unmanaged function name and corresponding library, and (v) use of a predefined separator between the unmanaged function name and corresponding library. In some embodiments, the system appends a function name (e.g., unmanaged function name) to the corresponding library, and separates the function name from the corresponding library by a dot or period (e.g., "."). In response to determining a string by appending the function name and library (e.g., with the predefined separator such as "."), the system adds such entry to the list of the set of unmanaged imported functions and/or corresponding libraries.

According to various embodiments, the system determines a hash with respect to the list of the set of unmanaged imported functions and/or corresponding libraries. Various hash functions may be used in connection with determining the hash. Examples of the hashing function include a SHA-256 hashing function, an MD5 hashing function, an SHA-1 hashing function, etc. Various other hashing functions may be implemented. The system uses the hashing function to determine the Unmanaged Imphash corresponding to the .NET file.

At 440, a determination is made as to whether the sample is malicious. In some embodiments, in response to determining the hash of the list of unmanaged imported API function names, the system uses the hash (e.g., the Unmanaged Imphash) in connection with determining whether the sample is malicious.

In some embodiments, the system uses the Unmanaged Imphash corresponding to the .NET file in connection determining whether the .NET file is malicious. As an example, in response to determining the Unmanaged Imphash corresponding to the .NET file, the system determines whether the Unmanaged Imphash matches an Unmanaged Imphash for a file deemed to be malicious. If the Unmanaged Imphash for the sample (e.g., the file being analyzed) matches an Unmanaged Imphash for a malicious file in the historical dataset (e.g., a record comprised in a blacklist of malicious files), the system deems the sample to be malicious. As an example, in response to determining the Unmanaged Imphash corresponding to the .NET file, the system determines whether the Unmanaged Imphash matches an Unmanaged Imphash for a file deemed to be benign. If the Unmanaged Imphash for the sample (e.g., the file being analyzed) matches an Unmanaged Imphash for a benign file in the historical dataset (e.g., a record comprised in a whitelist of benign files), the system deems the sample to be benign. In some embodiments, the system determines whether information pertaining to a particular file (e.g., the Unmanaged Imphash corresponding to a .NET file being analyzed) is comprised in a dataset of historical files and historical information associated with the historical dataset indicating whether a particular file is malicious (e.g., a third party service such as VirusTotal™). As an example, in response to determining that information pertaining to a particular file is not comprised in, or available in, dataset of historical files and historical information, the system deems the file to be benign (e.g., deem the file to not be malicious). An example of the historical information associated with the historical files indicating whether a particular file is malicious corresponds to a VirusTotal® (VT) score. In the case of a VT score greater than 0 for a particular file, the particular file is deemed malicious by the third party service. In some embodiments, the historical information associated with the historical file indicating whether a particular file is malicious corresponds to a social score such as a community-based score or rating (e.g., a reputation score) indicating that a file is malicious or likely to be malicious. The historical information (e.g., from a third party service, a community-based score, etc.) indicates whether other vendors or cyber security organizations deem the particular file to be malicious.

In response to a determination at 440 that the sample is malicious, process 400 proceeds to 450 at which an indication that the sample is malicious is provided.

In response to a determination that the sample is malicious at 440, process 400 proceeds to 450 at which an indication that the sample is malicious is provided. For example, the indication that the sample is malicious may be provided to the component from which the sample is received. As an example, the system provides the indication that the sample is malicious to a security entity. As another example, the system provides the indication that the sample is malicious to a client device. As an example, the security provides the indication that the sample is malicious to a client device. In some embodiments, the indication that the sample is malicious is provided to a user such as a user of a client device and/or a network administrator.

According to various embodiments, in response to receiving the indication that the sample is malicious, an active measure may be performed. The active measure may be performed in accordance (e.g., based at least in part on) one or more security policies. As an example, the one or more security policies may be preset by a network administrator, a customer (e.g., an organization/company) to a service that provides detection of malicious files, etc. Examples of active measures that may be performed include: isolating the file (e.g., quarantining the file), deleting the file, prompting the user to alert the user that a malicious file was detected, providing a prompt to a user when the a device attempts to open or execute the file, blocking transmission of the file, updating a blacklist of malicious files (e.g., a mapping of a hash for the file to an indication that the file is malicious, etc.

In response to a determination that the sample is not malicious at 440, process 400 proceeds to 460. In some embodiments, in response to determining that the sample is not malicious, a mapping of files (or hashes/signatures of files) to an indication that the file is not malicious is updated. For example, a whitelist of benign files is updated to include the sample, or hash, signature, or other unique identifier associated with the sample.

At 460, a determination is made as to whether process 400 is complete. In some embodiments, process 400 is determined to be complete in response to a determination that no further samples are to be analyzed (e.g., no further predictions for files are needed), an administrator indicates that process 400 is to be paused or stopped, etc. In response to a determination that process 400 is complete, process 400 ends. In response to a determination that process 400 is not complete, process 400 returns to 410.

Figure 5:
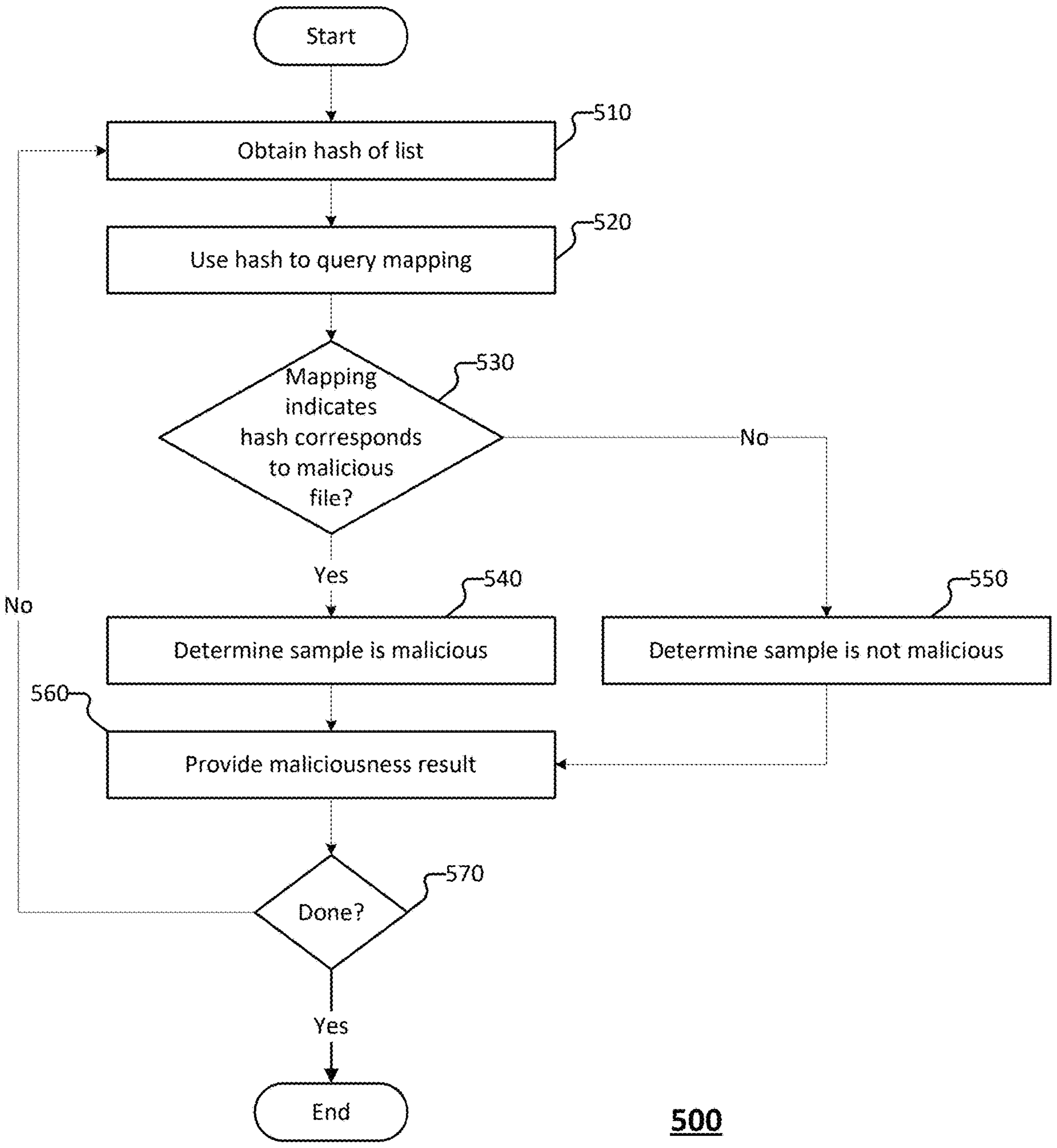
FIG. 5 is a flow diagram of a method for determining whether a file is malicious according to various embodiments.

FIG. 5 is a flow diagram of a method for determining whether a file is malicious according to various embodiments. In some embodiments, process 500 is implemented at least in part on by system 100 of FIG. 1 and/or system 200 of FIG. 2. In some implementations, process 500 may be implemented by one or more servers, such as in connection with providing a service to a network (e.g., a security entity and/or a network endpoint such as a client device). In some implementations, process 500 may be implemented by a security entity (e.g., a firewall) such as in connection with enforcing a security policy with respect to files communicated across a network or in/out of the network. In some implementations, process 500 may be implemented by a client device such as a laptop, a smartphone, a personal computer, etc., such as in connection with executing or opening a file such as an email attachment.

According to various embodiments, process 500 is invoked in connection with 440 of process 400 of FIG. 4.

At 510, a hash of a list is obtained. In some embodiments, the system obtains (e.g., receives, determines, etc.) an Unmanaged Imphash. For example, the system receives the hash of a list of unmanaged imported API function names.

At 520, the hash is used in connection with querying a mapping. In response to receiving the hash of the list (e.g., the Unmanaged Imphash), the system performs a lookup against a historical dataset of malicious files and/or benign files. For example, the historical data set comprises an association between Unmanaged Imphashes and indications of whether the corresponding files are malicious or benign.

In some embodiments, the system uses the Unmanaged Imphash corresponding to the .NET file in connection determining whether the .NET file is malicious. As an example, in response to determining the Unmanaged Imphash corresponding to the .NET file, the system determines whether the Unmanaged Imphash matches an Unmanaged Imphash for a file deemed to be malicious. As an example, in response to determining the Unmanaged Imphash corresponding to the .NET file, the system determines whether the Unmanaged Imphash matches an Unmanaged Imphash for a file deemed to be benign. In some embodiments, the system determines whether information pertaining to a particular file (e.g., the Unmanaged Imphash corresponding to a .NET file being analyzed) is comprised in a dataset of historical files and historical information associated with the historical dataset indicating whether a particular file is malicious (e.g., a third party service such as VirusTotal™). As an example, in response to determining that information pertaining to a particular file is not comprised in, or available in, dataset of historical files and historical information, the system deems the file to be benign (e.g., deem the file to not be malicious). An example of the historical information associated with the historical files indicating whether a particular file is malicious corresponds to a VirusTotal® (VT) score. In the case of a VT score greater than 0 for a particular file, the particular file is deemed malicious by the third party service. In some embodiments, the historical information associated with the historical file indicating whether a particular file is malicious corresponds to a social score such as a community-based score or rating (e.g., a reputation score) indicating that a file is malicious or likely to be malicious. The historical information (e.g., from a third party service, a community-based score, etc.) indicates whether other vendors or cyber security organizations deem the particular file to be malicious.

At 530, a determination is made as to whether the mapping indicates that the hash corresponds a malicious file.

In response to a determination that the mapping indicates that the hash corresponds to a malicious file at 530, process 500 proceeds to 530 at which the sample is determined to be malicious.

In response to a determination that the mapping indicates that the hash does not correspond to a malicious file at 530, process 500 proceeds to 550 at which the sample is determined to be not malicious. In some embodiments, the system determines that the sample is benign in response to a determination that the mapping of hashes to files does not include an indication that the hash is mapped to a malicious file. As an example, the system determines that the hash is not comprised in a mapping of hashes to malicious files. As another example, the system determines that the mapping does not comprise a record that is mapped to a malicious file (or an indication of a malicious file).

If the Unmanaged Imphash for the sample (e.g., the file being analyzed) matches an Unmanaged Imphash for a malicious file in the historical dataset (e.g., a record comprised in a blacklist of malicious files), the system deems the sample to be malicious.

If the Unmanaged Imphash for the sample (e.g., the file being analyzed) matches an Unmanaged Imphash for a benign file in the historical dataset (e.g., a record comprised in a whitelist of benign files), the system deems the sample to be benign. In some embodiments, in response to determining that information pertaining to a particular file is not comprised in, or available in, dataset of historical files and historical information, the system deems the file to be benign (e.g., deem the file to not be malicious).

At 560, a maliciousness result is provided. In some embodiments, the system provides an indication that hash corresponds to a malicious file. For example, the system provides an indication that the file corresponding to the hash is malicious.

At 570, a determination is made as to whether process 500 is complete. In some embodiments, process 500 is determined to be complete in response to a determination that no further hashes are to be analyzed (e.g., no further predictions for files are needed), an administrator indicates that process 500 is to be paused or stopped, etc. In response to a determination that process 500 is complete, process 500 ends. In response to a determination that process 500 is not complete, process 500 returns to 510.

Figure 6:
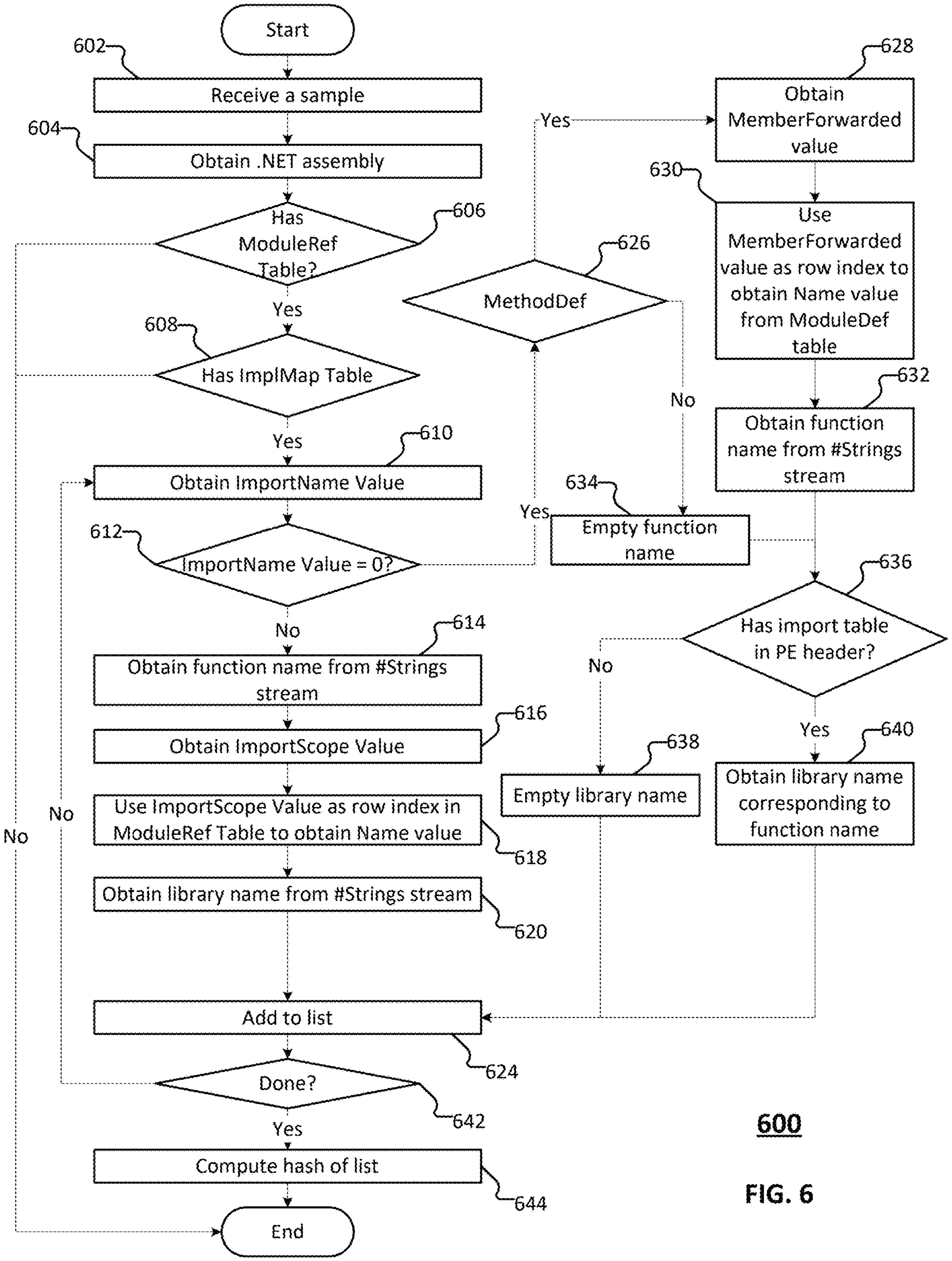
FIG. 6 is a flow diagram of a method for detecting a malicious file according to various embodiments.

FIG. 6 is a flow diagram of a method for detecting a malicious file according to various embodiments. In some embodiments, process 600 is implemented at least in part on by system 100 of FIG. 1 and/or system 200 of FIG. 2. In some implementations, process 600 may be implemented by one or more servers, such as in connection with providing a service to a network (e.g., a security entity and/or a network endpoint such as a client device). In some implementations, process 600 may be implemented by a security entity (e.g., a firewall) such as in connection with enforcing a security policy with respect to files communicated across a network or in/out of the network. In some implementations, process 600 may be implemented by a client device such as a laptop, a smartphone, a personal computer, etc., such as in connection with executing or opening a file such as an email attachment.

At 602, a sample is received.

At 604, a .NET assembly corresponding to the sample is obtained. In some embodiments, the sample is compressed (e.g., in a ZIP format, etc.) and the .NET assembly is extracted from the compressed file. In some embodiments, obtaining the .NET assembly comprises determining that the sample is a .NET file.

At 606, a determination of whether the .NET assembly comprises a ModuleRef table is made. In response to determining that the .NET assembly does not comprise a ModuleRef table, process 600 ends. Conversely, in response to determining that the .NET assembly comprises a ModuleRef table, process 600 proceeds to 608.

At 608, a determination of whether the .NET assembly comprises an ImplMap table is made. In response to determining that the .NET assembly does not comprise an ImplMap table, process 600 ends. Conversely, in response to determining that the .NET assembly comprises an ImplMap table, process 600 proceeds to 610.

At 610, an ImportName value is obtained. In some embodiments, the system obtains the ImportName value from the ImportName column of the ImplMap table. For example, the system the ImportName value from an applicable row (e.g., a selected row) of the ImportName column. In some embodiments, the system iterates over the rows of the ImportName to obtain values for each applicable row of the ImportName column.

At 612, a determination of whether the ImportName value obtained at 610 is equal to 0. In response to a determination that the ImportName value obtained at 610 is equal to 0, process 600 proceeds to 626. In response to a determination that the ImportName value obtained at 610 is not equal to 0, process 600 proceeds to 614.

At 614, a function name is obtained from the #Strings stream. In some embodiments, the system obtains the function name from the #Strings stream of the .NET assembly using the selected row.

At 616, a value from the ImportScope column is obtained. In some embodiments, the system obtains the value from the ImportScope column of the ImplMap table. The system obtains the ImplMap table using the .NET header (e.g., the .NET header comprises the ImplMap table). The value in the ImportScope column is obtained from the selected row (e.g., the row of the ImplMap table from which the ImportName value is obtained and/or the row for the Info column from which the #Strings stream information is obtained). In some embodiments, the value from the ImportScope column is used as an index in connection with performing a lookup into the ModuleRef table (e.g., for the name of the corresponding library).

At 618, the ImportScope value is used as a row index in the ModuleRef table to obtain a value. In some embodiments, the system obtains the ModuleRef table using the .NET header (e.g., the .NET header comprises the ModuleRef table). The system performs a lookup in the ModuleRef table using the value obtained from the ImportScope column as an index. For example, the system uses the value obtained from the ImportScope column to determine a row of the ModuleRef table from which the system is to obtain a value from the Name column. In some embodiments, the value obtained from the Name column of the ModuleRef table is used as an index to the #Strings stream.

At 620, a library name is obtained from the #Strings stream. In some embodiments, the system obtains the #Strings stream using the .NET header (e.g., the .NET header comprises the #Strings stream). The system performs a lookup in the #Strings stream using the value obtained from the Name column as an index.

At 624, the string corresponding to the library name—function name pair is added to the list. For example, the library name—function name pair is added to the list of unmanaged imported functions. In some embodiments, the system generates the string according to a predetermined format or syntax.

At 626, a determination of whether the .NET assembly comprises a MethodDef table is made. In response to determining that the .NET assembly does not comprise a MethodDef table, process 600 proceeds to 634 at which the system deems that the .NET header has an empty function name. Conversely, in response to determining that the .NET assembly comprises a MethodDef table, process 600 proceeds to 628.

At 628, a value is obtained from the MemberForwarded column of the ImplMap table. The system obtains the ImplMap table using the .NET header (e.g., the .NET header comprises the ImplMap table). The value in the MemberForwarded column is obtained from the selected row (e.g., the row of the ImplMap table from which the MemberForwarded value is obtained and). In some embodiments, the value from the MemberForwarded column is used as an index in connection with performing a lookup into the ModuleRef table (e.g., for the name of the corresponding library).

At 630, the MemberForwarded value is used as a row index in the ModuleRef table to obtain a value. In some embodiments, the system obtains the ModuleRef table using the .NET header (e.g., the .NET header comprises the ModuleRef table). The system performs a lookup in the ModuleRef table using the value obtained from the MemberForwarded column as an index. For example, the system uses the value obtained from the Name column to determine a row of the ModuleRef table from which the system is to obtain a value from the #Strings stream.

At 632, a function name is obtained from the #Strings stream. In some embodiments, the system obtains the #Strings stream using the .NET header (e.g., the .NET header comprises the #Strings stream). The system performs a lookup in the #Strings stream using the value obtained from the Name column in the ModuleDef table as an index.

At 636, a determination of whether the PE header has an import table is performed. In some embodiments, the system determines whether the PE header comprises an import table in connection with determining a library name corresponding to the function name (e.g., the function name obtained from the #Strings stream).

In response to a determination that the PE header does not have an import table at 636, process 600 proceeds to 638 at which the system deems the library name to be an empty library name. Conversely, in response to a determination that the PE header has an import table at 636, process 600 proceeds to 640 at which the library name corresponding to the function name is obtained. In some embodiments, the system parses the import table to obtain the library name corresponding to the function name. In response to obtaining the library name, process 600 proceeds to 624.

After the function name and corresponding library name is added to the list at 624, process 600 proceeds to 642.

At 642, a determination is made as to whether the population (e.g., generating) of the list is complete. In some embodiments, the population/generation of the list is determined to be complete in response to a determination that no further imported functions and/or corresponding libraries are to be added to the list (e.g., no further imported functions are comprised or referenced in the .NET header), an administrator indicates that process 600 is to be paused or stopped, etc. In response to a determination that no further imported functions and/or corresponding libraries are to be added to the list at 642, process 600 proceeds to 644 at which the system determines (e.g., computes) a hash of the list (e.g., the list of unmanaged imported functions). In response to a determination that process 600 is not complete, process 600 returns to 602. In some embodiments, in response to computing the hash (e.g., the Unmanaged Imphash), the system determines whether the sample is malicious based at least in part on the Unmanaged Imphash. For example, in response to computing the hash, process 500 of FIG. 5 is invoked.

Figure 7A:
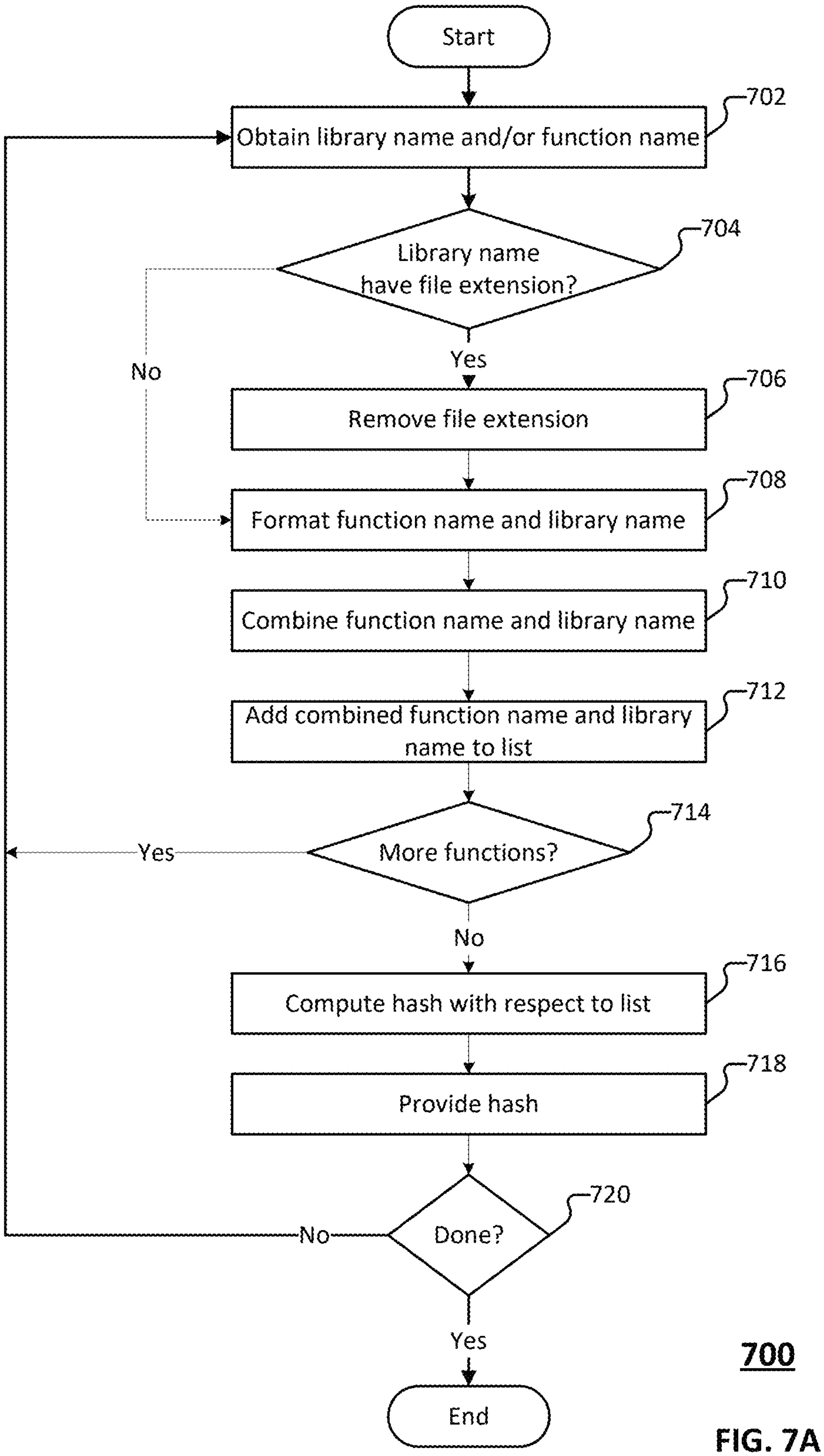
FIG. 7A is a flow diagram of a method for detecting a malicious file according to various embodiments.
Figure 7B:
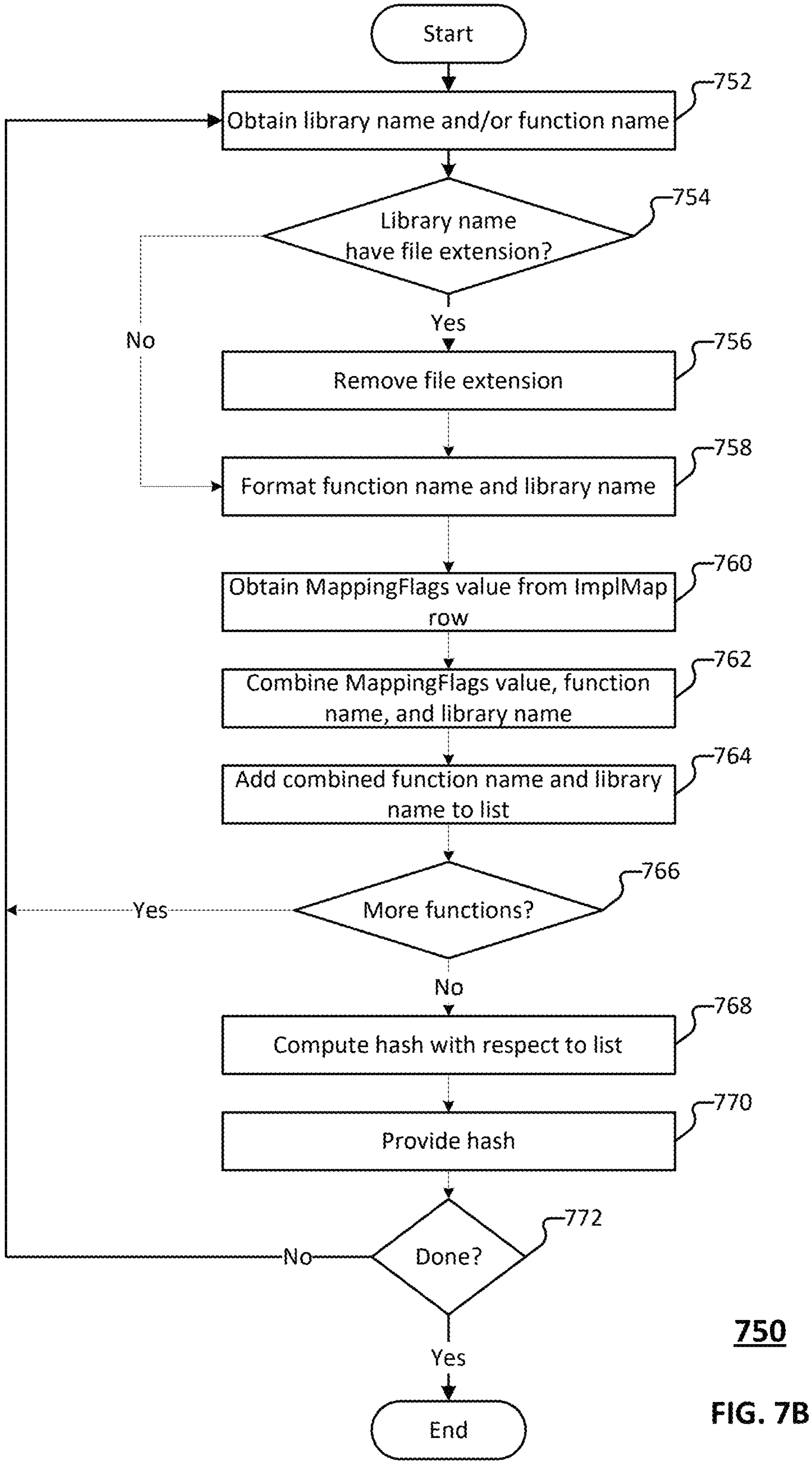
FIG. 7B is a flow diagram of a method for detecting a malicious file according to various embodiments.

In some embodiments, the system determines the hash of the list by invoking process 700 of FIG. 7A or process 750 of FIG. 7B.

FIG. 7A is a flow diagram of a method for detecting a malicious file according to various embodiments. In some embodiments, process 700 is implemented at least in part on by system 100 of FIG. 1 and/or system 200 of FIG. 2. In some implementations, process 600 may be implemented by one or more servers, such as in connection with providing a service to a network (e.g., a security entity and/or a network endpoint such as a client device). In some implementations, process 700 may be implemented by a security entity (e.g., a firewall) such as in connection with enforcing a security policy with respect to files communicated across a network or in/out of the network. In some implementations, process 700 may be implemented by a client device such as a laptop, a smartphone, a personal computer, etc., such as in connection with executing or opening a file such as an email attachment.

At 702, a library name and/or function name is obtained. In some embodiments, the function name and corresponding library name that is obtained using the .NET header is obtained such as in connection with generating a list of unmanaged imported functions.

At 704, a determination of whether the library name has a file extension is performed. In response to determining that the library name has a file extension at 704, process 700 proceeds to 706 at which the file extension is removed. In response to a determination that the library name does not have a file extension at 704, process 700 proceeds to 708.

At 708, the function name and library name is formatted. In some embodiments, the system formats the library name—function name pair according to a predetermined format or syntax. As another example, the system formats the function names and the library names to convert any uppercase letters to lowercase letters.

At 710, the function name and library name are combined. In some embodiments, the system builds a string that corresponds to a combination of the function name for an imported function (e.g., an unmanaged imported function) and a library name corresponding to the imported function. For example, the system builds the string in a manner that appends the library name to the function name, and a predefined separator (e.g., ".") is included between the library name and the function name. According to various embodiments, the system determines the string according to the format: <LibraryName>.<FunctionName>. The system then adds the string to a list of unmanaged imported functions (e.g., a list for which the Unmanaged Imphash is determined).

According to various embodiments, various formats or syntax may be implemented in connection with the system combining the function name and library name. Examples of the predetermined format include (i) lower case alphanumeric strings, (ii) removal of file extensions, (iii) removal of library extensions (e.g., removal of .dll from the corresponding library name), (iv) appending an unmanaged function name and corresponding library, and (v) use of a predefined separator between the unmanaged function name and corresponding library, (vi) order of combining the library name and function name to determine string (e.g., <LibraryName>.<FunctionName>, or <FunctionName>.<LibraryName>). In some embodiments, the system appends a function name (e.g., unmanaged function name) to the corresponding library, and separates the function name from the corresponding library by a dot or period (e.g., "."). In response to determining a string by appending the function name and library (e.g., with the predefined separator such as "."), the system adds such entry to the list of the set of unmanaged imported functions and/or corresponding libraries. Various other predefined formats/syntaxes may be implemented.

At 712, the combination of the function name and library name is added to the list of unmanaged imported functions.

At 714, a determination is made as to whether more functions are to be added to the list. For example, the system determines whether more unmanaged imported functions are to be added to the list of unmanaged imported functions for the file. In response to a determination that no further functions are to be added to the list at 714, process 700 proceeds to 716. In response to a determination that additional functions are to be added to the list, process 700 returns to 702.

At 716, a hash is computed with respect to the list. According to various embodiments, the system determines a hash with respect to the list of the set of unmanaged imported functions and/or corresponding libraries. Various hash functions may be used in connection with determining the hash. Examples of the hashing function include a SHA-256 hashing function, an MD5 hashing function, an SHA-1 hashing function, etc. Various other hashing functions may be implemented. The system uses the hashing function to determine the Unmanaged Imphash corresponding to the .NET file.

In some embodiments, the system transform or formats the list according to a predefined format. For example, the list of library<->function(<->mappingflags) name pairs get transformed into a comma separated string. According to such an example, instead of a calculating the hash on the following list kernel32.createprocess
kernel32.getthreadcontext
kernel32.wow64getthreadcontext
kernel32.setthreadcontext
kernel32.wow64setthreadcontext
kernel32.readprocessmemory The system create a comma separated string with the single list items (library<->function pairs): "kernel32.createprocess,kernel32.getthreadcontext, kernel32.wow64getthreadcontext,kernel32.set threadcontext,kernel32.wow64setthreadcontext, kernel32.readprocessmemory, . . . " In response to transforming/creating the comma separated string with the single list items, the system determines (e.g., computes the hash) with respect to such string.

At 718, the hash is provided. In some embodiments, the system provides the hash to another system or module such as in connection with such system or module determining whether the file is malicious. For example, the hash is provided as a response to the invocation of process 700.

At 720, a determination is made as to whether process 700 is complete. In some embodiments, process 700 is determined to be complete in response to a determination that no further hashes are to be computed (e.g., no further predictions for files are needed), an administrator indicates that process 700 is to be paused or stopped, etc. In response to a determination that process 700 is complete, process 700 ends. In response to a determination that process 700 is not complete, process 700 returns to 702.

FIG. 7B is a flow diagram of a method for detecting a malicious file according to various embodiments.

In some embodiments, process 700 is implemented at least in part on by system 100 of FIG. 1 and/or system 200 of FIG. 2. In some implementations, process 600 may be implemented by one or more servers, such as in connection with providing a service to a network (e.g., a security entity and/or a network endpoint such as a client device). In some implementations, process 700 may be implemented by a security entity (e.g., a firewall) such as in connection with enforcing a security policy with respect to files communicated across a network or in/out of the network. In some implementations, process 700 may be implemented by a client device such as a laptop, a smartphone, a personal computer, etc., such as in connection with executing or opening a file such as an email attachment.

According to various embodiments, 750 is more strict as compared to 700 of FIG. 7A because 750 includes additional information of the unmanaged functions (e.g., information pertaining to a manner by which the unmanaged functions were defined in the code by the author, etc.). As an example, the final hash of 750 may also be more strict and potentially less false positive prone. However, the disadvantage is that the final hash of 750 potentially hits on less malware samples than the final hash of 700.

At 752, a library name and/or function name is obtained. In some embodiments, the function name and corresponding library name that is obtained using the .NET header is obtained such as in connection with generating a list of unmanaged imported functions.

At 754, a determination of whether the library name has a file extension is performed. In response to determining that the library name has a file extension at 754, process 750 proceeds to 756 at which the file extension is removed. In response to a determination that the library name does not have a file extension at 754, process 700 proceeds to 760.

At 758, the function name and library name is formatted. In some embodiments, the system formats the library name—function name pair according to a predetermined format or syntax. As another example, the system formats the function names and the library names to convert any uppercase letters to lowercase letters.

At 760, a MappingFlags value is obtained. In some embodiments, the system obtains the MappingFlags value from the ImplMap table. For example, the system obtains the MappingFlags value from a row in the ImplMap table corresponding to the function. The MappingFlags value comprises P/Invoke attributes.

At 762, the MappingFlags value, the function name and the library name are combined. In some embodiments, the system builds a string that corresponds to a combination of MappingFlags value, the function name for an imported function (e.g., an unmanaged imported function) and a library name corresponding to the imported function. For example, the system builds the string in a manner that appends the MappingFlags value and the library name to the function name, and a predefined separator (e.g., ".") is included between the library name and the function name. According to various embodiments, the system determines the string according to the format: <LibraryName>.<FunctionName>.<MappingFlags>. The system then adds the string to a list of unmanaged imported functions (e.g., a list for which the Unmanaged Imphash is determined).

According to various embodiments, various formats or syntax may be implemented in connection with the system combining the function name and library name. Examples of the predetermined format include (i) lower case alphanumeric strings, (ii) removal of file extensions, (iii) removal of library extensions (e.g., removal of .dll from the corresponding library name), (iv) appending an unmanaged function name and corresponding library, and (v) use of a predefined separator between the unmanaged function name and corresponding library, (vi) order of combining the library name and function name to determine string (e.g., <LibraryName>.<FunctionName>.<MappingFlags>, <FunctionName>.<LibraryName>.<MappingFlags>, etc.). In some embodiments, the system appends a function name (e.g., unmanaged function name) to the corresponding library, and separates the function name from the corresponding library by a dot or period (e.g., "."). In response to determining a string by appending the function name and library (e.g., with the predefined separator such as "."), the system adds such entry to the list of the set of unmanaged imported functions and/or corresponding libraries. Various other predefined formats/syntaxes may be implemented.

At 764, the combination of the function name and library name is added to the list of unmanaged imported functions.

At 766, a determination is made as to whether more functions are to be added to the list. For example, the system determines whether more unmanaged imported functions are to be added to the list of unmanaged imported functions for the file. In response to a determination that no further functions are to be added to the list at 766, process 750 proceeds to 752. In response to a determination that additional functions are to be added to the list, process 750 returns to 752.

At 768, a hash is computed with respect to the list. According to various embodiments, the system determines a hash with respect to the list of the set of unmanaged imported functions and/or corresponding libraries. Various hash functions may be used in connection with determining the hash. Examples of the hashing function include a SHA-256 hashing function, an MD5 hashing function, an SHA-1 hashing function, etc. Various other hashing functions may be implemented. The system uses the hashing function to determine the Unmanaged Imphash corresponding to the .NET file.

In some embodiments, the system transform or formats the list according to a predefined format. For example, the list of library<->function(<->mappingflags) name pairs get transformed into a comma separated string. According to such an example, instead of a calculating the hash on the following list kernel32.createprocess
kernel32.getthreadcontext
kernel32.wow64getthreadcontext
kernel32.setthreadcontext
kernel32.wow64setthreadcontext
kernel32.readprocessmemory The system create a comma separated string with the single list items (library<->function pairs): "kernel32.createprocess,kernel32.getthreadcontext, kernel32.wow64getthreadcontext,kernel32.set threadcontext,kernel32.wow64setthreadcontext, kernel32.readprocessmemory, . . . " In response to transforming/creating the comma separated string with the single list items, the system determines (e.g., computes the hash) with respect to such string.

At 770, the hash is provided. In some embodiments, the system provides the hash to another system or module such as in connection with such system or module determining whether the file is malicious. For example, the hash is provided as a response to the invocation of process 750.

At 772, a determination is made as to whether process 750 is complete. In some embodiments, process 750 is determined to be complete in response to a determination that no further hashes are to be computed (e.g., no further predictions for files are needed), an administrator indicates that process 750 is to be paused or stopped, etc. In response to a determination that process 750 is complete, process 750 ends. In response to a determination that process 750 is not complete, process 750 returns to 752.

Figure 8:
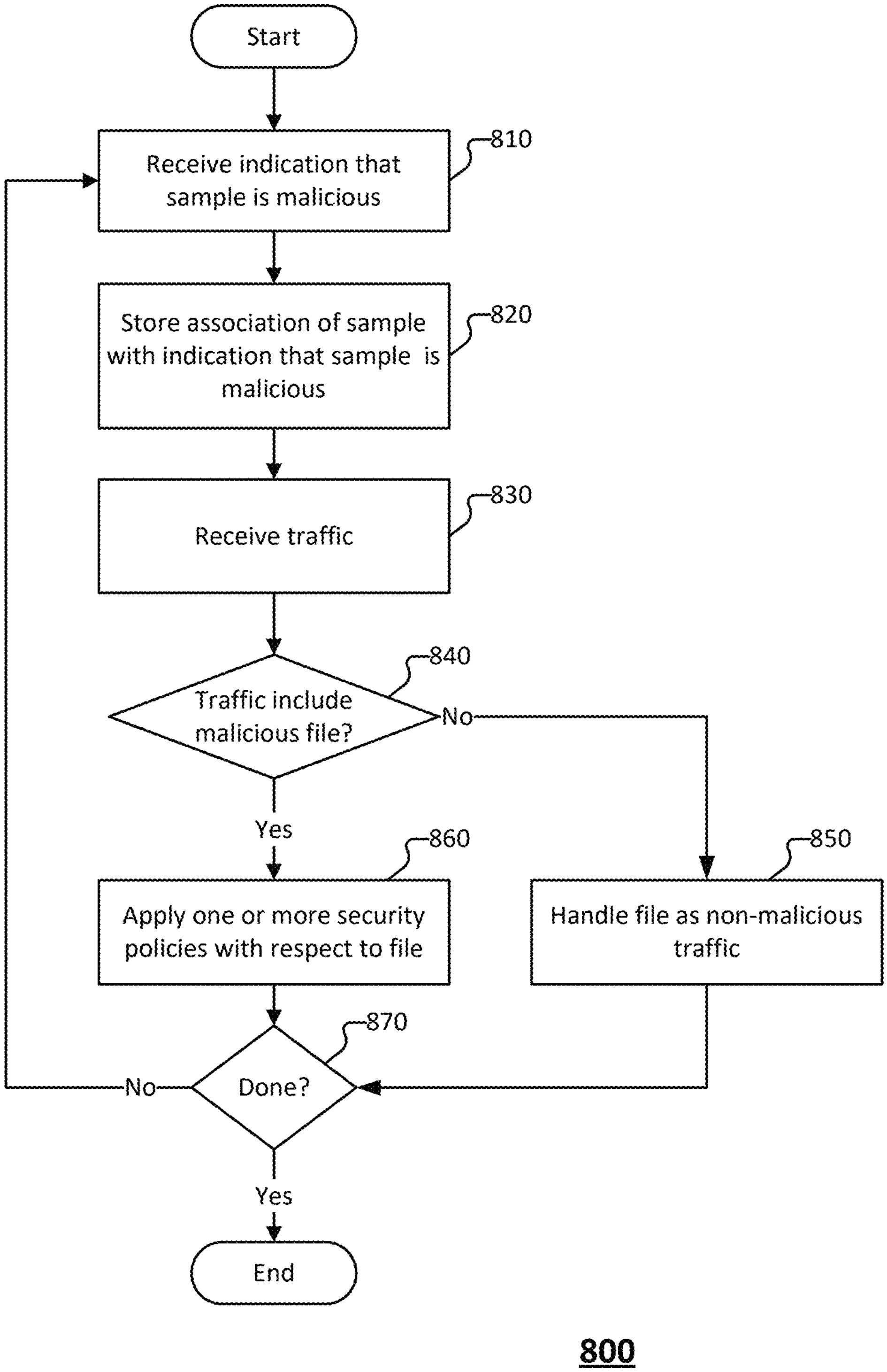
FIG. 8 is a flow diagram of a method for detecting a malicious file according to various embodiments.

FIG. 8 is a flow diagram of a method for detecting a malicious file according to various embodiments. In some embodiments, process 800 is implemented at least in part on by system 100 of FIG. 1 and/or system 200 of FIG. 2. In some implementations, process 800 may be implemented by one or more servers, such as in connection with providing a service to a network (e.g., a security entity and/or a network endpoint such as a client device). In some implementations, process 800 may be implemented by a security entity (e.g., a firewall) such as in connection with enforcing a security policy with respect to files communicated across a network or in/out of the network. In some implementations, process 800 may be implemented by a client device such as a laptop, a smartphone, a personal computer, etc., such as in connection with executing or opening a file such as an email attachment.

At 810, an indication that the sample is malicious is received. In some embodiments, the system receives an indication that a sample is malicious and the sample or hash, signature, or other unique identifier associated with the sample. For example, the system may receive the indication that the sample is malicious from a service such as a security or malware service. The system may receive the indication that the sample is malicious from one or more servers.

According to various embodiments, the indication that the sample is malicious is received in connection with an update to a set of previously identified malicious files. For example, the system receives the indication that the sample is malicious as an update to a blacklist of malicious files.

At 820, an association of the sample with an indication that the sample is malicious is stored. In response to receiving the indication that the sample is malicious, the system stores the indication that the sample is malicious in association with the sample or an identifier corresponding to the sample to facilitate a lookup (e.g., a local lookup) of whether subsequently received files are malicious. In some embodiments, the identifier corresponding to the sample stored in association with the indication that the sample is malicious comprises a hash of the file (or part of the file), a signature of the file (or part of the file), or another unique identifier associated with the file. In some embodiments, the storing the sample in association with the indication of whether the sample is malicious comprises storing an Unmanaged Imphash for the .NET file in association with an indication of whether the sample is malicious.

At 830, traffic is received. The system may obtain traffic such as in connection with routing traffic within/across a network, or mediating traffic into/out of a network such as a firewall, or a monitoring of email traffic or instant message traffic.

At 840, a determination of whether the traffic includes a malicious file is performed. In some embodiments, the system obtains the file from the received traffic. For example, the system identifies the file as an attachment to an email, identifies the file as being exchanged between two client devices via instant message program or other file exchange program, etc. In response to obtaining the file from the traffic, the system determines whether the file corresponds to a file comprised in a set of previously identified malicious files such as a blacklist of malicious files. In response to determining that the file is comprised in the set of files on the blacklist of malicious files, the system determines that the file is malicious (e.g., the system may further determine that the traffic includes the malicious file).

In some embodiments, the system determines whether the file corresponds to a file comprised in a set of previously identified benign files such as a whitelist of benign files. In response to determining that the file is comprised in the set of files on the whitelist of benign files, the system determines that the file is not malicious (e.g., the system may further determine that the traffic includes the malicious file).

According to various embodiments, in response to determining the file is not comprised in a set of previously identified malicious files (e.g., a blacklist of malicious files) or a set of previously identified benign files (e.g., a whitelist of benign files), the system deems the file as being non-malicious (e.g., benign).

According to various embodiments, in response to determining the file is not comprised in a set of previously identified malicious files (e.g., a blacklist of malicious files) or a set of previously identified benign files (e.g., a whitelist of benign files), the system queries a malicious file detector to determine whether the file is malicious. For example, the system may quarantine the file until the system receives response form the malicious file detector as to whether the file is malicious. The malicious file detector may perform an assessment of whether the file is malicious such as contemporaneous with the handling of the traffic by the system (e.g., in real-time with the query from the system). The malicious file detector may correspond to malicious file detector 170 of system 100 of FIG. 1 and/or system 200 of FIG. 2.

In some embodiments, the system determines whether the file is comprised in the set of previously identified malicious files or the set of previously identified benign files by computing a hash or determining a signature or other unique identifier associated with the file, and performing a lookup in the set of previously identified malicious files or the set of previously identified benign files for a file matching the hash, signature or other unique identifier. Various hashing techniques may be implemented. According to various embodiments, the determining whether the file is comprised in the set of previously identified malicious files or the set of previously identified benign files includes determining the Unmanaged Imphash corresponding to the file, and determining whether the Unmanaged Imphash is comprised in a historical dataset (e.g., a dataset comprising results of previous determinations of maliciousness).

In response to a determination that the traffic does not include a malicious file at 840, process 800 proceeds to 850 at which the file is handled as non-malicious traffic/information.

In response to a determination that the traffic does not include a malicious file at 840, process 800 proceeds to 860 at which the file is handled as malicious traffic/information. The system may handle the malicious traffic/information based at least in part on one or more policies such as one or more security policies.

According to various embodiments, the handling of the file malicious traffic/information may include performing an active measure. The active measure may be performed in accordance (e.g., based at least in part on) one or more security policies. As an example, the one or more security policies may be preset by a network administrator, a customer (e.g., an organization/company) to a service that provides detection of malicious files, etc. Examples of active measures that may be performed include: isolating the file (e.g., quarantining the file), deleting the file, prompting the user to alert the user that a malicious file was detected, providing a prompt to a user when the a device attempts to open or execute the file, blocking transmission of the file, updating a blacklist of malicious files (e.g., a mapping of a hash for the file to an indication that the file is malicious, etc.

At 870, a determination is made as to whether process 800 is complete. In some embodiments, process 800 is determined to be complete in response to a determination that no further samples are to be analyzed (e.g., no further predictions for files are needed), an administrator indicates that process 800 is to be paused or stopped, etc. In response to a determination that process 800 is complete, process 800 ends. In response to a determination that process 800 is not complete, process 800 returns to 810.

Figure 9:
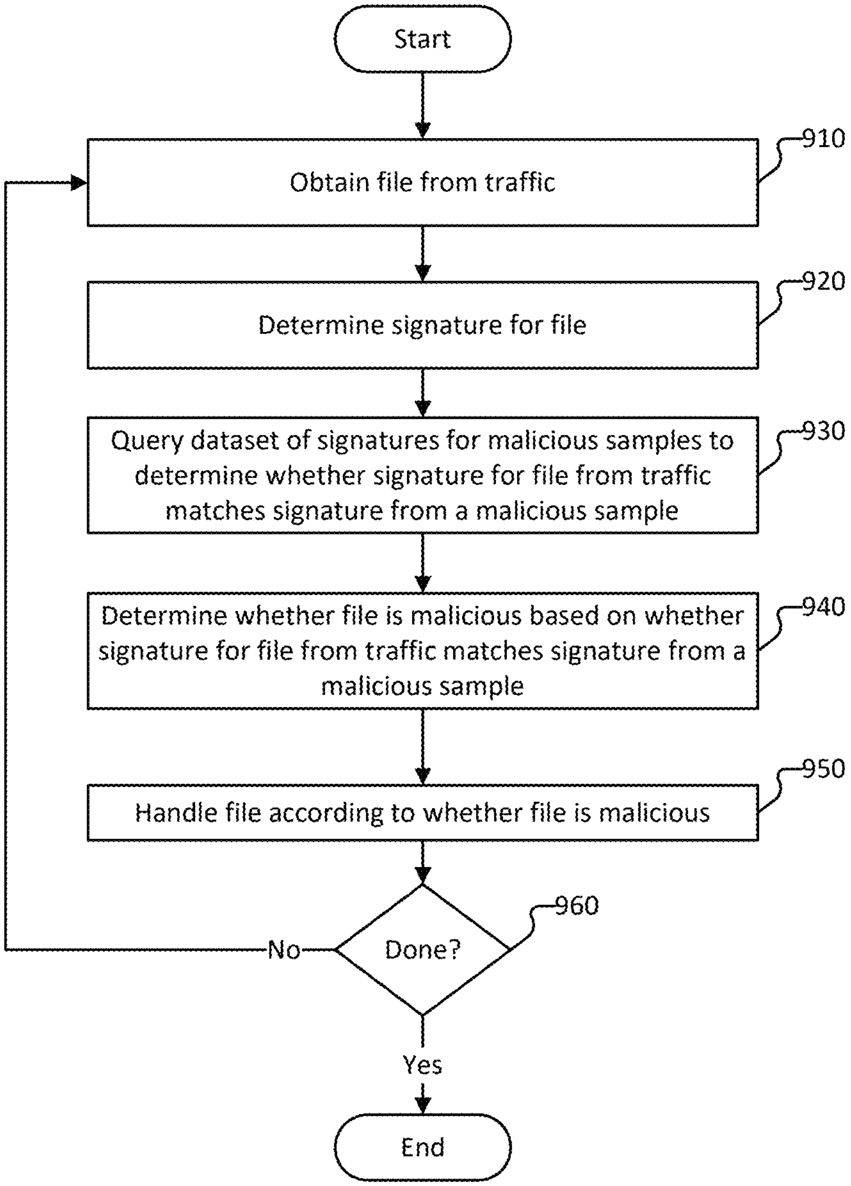
FIG. 9 is a flow diagram of a method for detecting a malicious file according to various embodiments.

FIG. 9 is a flow diagram of a method for detecting a malicious file according to various embodiments. In some embodiments, process 900 is implemented at least in part on by system 100 of FIG. 1 and/or system 200 of FIG. 2. In some implementations, process 900 may be implemented by a security entity (e.g., a firewall) such as in connection with enforcing a security policy with respect to files communicated across a network or in/out of the network, and/or an anti-malware application running on a client system, etc. In some implementations, process 900 may be implemented by a client device such as a laptop, a smartphone, a personal computer, etc., such as in connection with executing or opening a file such as an email attachment.

At 910 a file is obtained from traffic. The system may obtain traffic such as in connection with routing traffic within/across a network, or mediating traffic into/out of a network such as a firewall, or a monitoring of email traffic or instant message traffic. In some embodiments, the system obtains the file from the received traffic. For example, the system identifies the file as an attachment to an email, identifies the file as being exchanged between two client devices via instant message program or other file exchange program, etc.

At 920, a signature corresponding to the file is determined. In some embodiments, the system computes a hash or determines a signature or other unique identifier associated with the file. Various hashing techniques may be implemented. For example, the hashing technique may be the determining (e.g., computing) the MD5 hash for a file. In some embodiments, the determining a signature corresponding to the file comprises computing an Unmanaged Imphash for the .NET file.

At 930, a dataset for signatures of malicious samples is queried to determine whether the signature corresponding to the file matches a signature from a malicious sample. In some embodiments, the system performing a lookup in the dataset for signatures of malicious samples for a file matching the hash, signature or other unique identifier. The dataset for signatures of malicious samples may be stored locally at the system or remotely on a storage system that is accessible to the system.

According to various embodiments, the determining whether the file is comprised in the set of previously identified malicious files or the set of previously identified benign files includes determining the Unmanaged Imphash corresponding to the file, and determining whether the Unmanaged Imphash is comprised in a historical dataset (e.g., a dataset comprising results of previous determinations of maliciousness).

At 940, a determination of whether the file is malicious is made based at least in part on whether a signature for the file matches a signature for a malicious sample. In some embodiments, the system determines whether the dataset of malicious signature comprises a record matching the signature for the file obtained from traffic. In response to determining that the historical dataset comprises an indication that a file corresponding to the Unmanaged Imphash is malicious (e.g., the Unmanaged Imphash is included in a blacklist of fields), the system deems the file obtained from the traffic at 910 to be malicious.

At 950, the file is handled according to whether the file is malicious. In some embodiments, in response to determining that the file is malicious, the system applies one or more security policies with respect to the file. In some embodiments, in response to determining that the file is not malicious, the system handles the file as being benign (e.g., the file is handled as normal traffic).

At 960, a determination is made as to whether process 900 is complete. In some embodiments, process 900 is determined to be complete in response to a determination that no further samples are to be analyzed (e.g., no further predictions for files are needed), an administrator indicates that process 900 is to be paused or stopped, etc. In response to a determination that process 900 is complete, process 900 ends. In response to a determination that process 900 is not complete, process 900 returns to 910.

Figure 10:
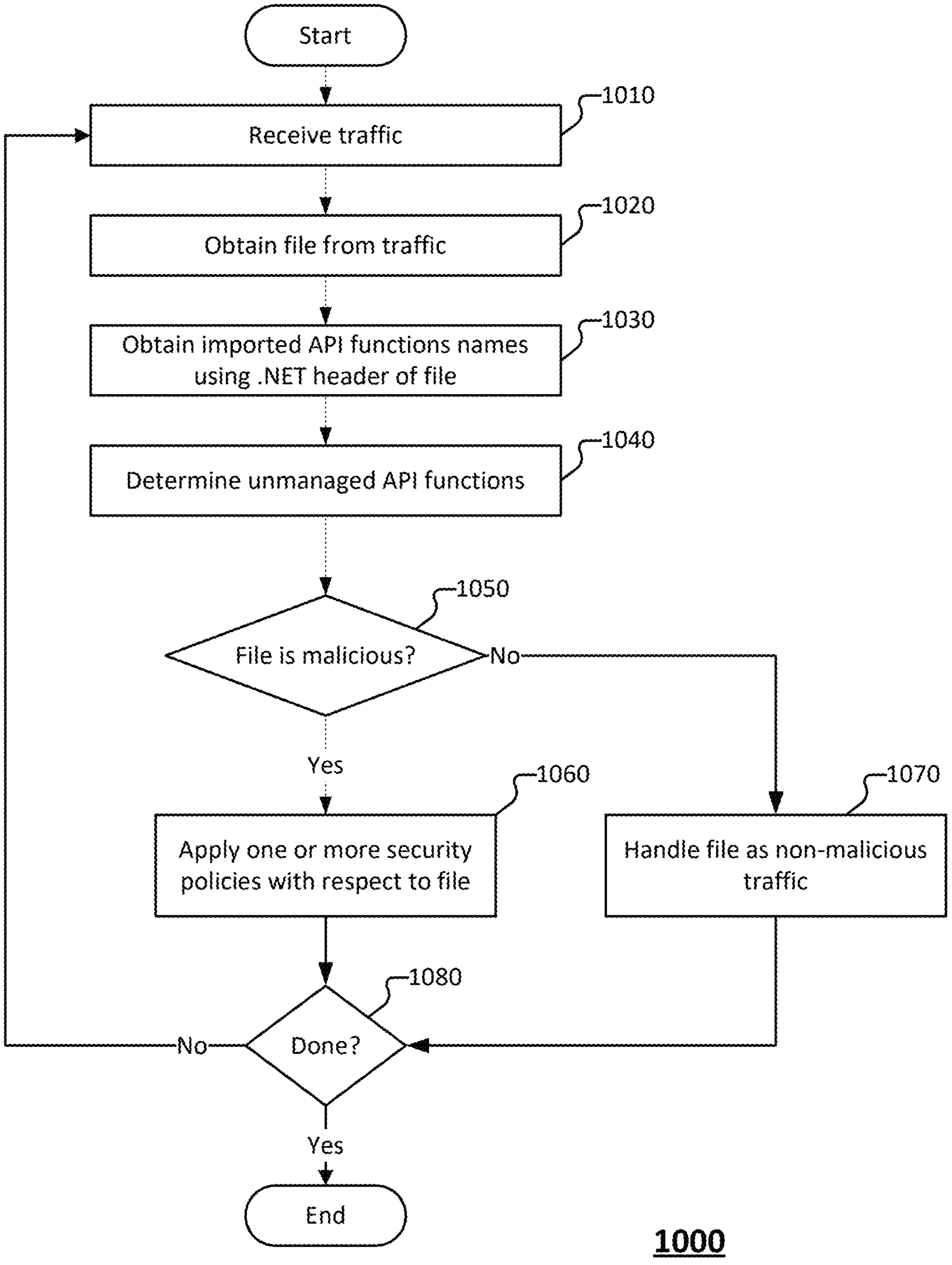
FIG. 10 is a flow diagram of a method for detecting a malicious file according to various embodiments.

FIG. 10 is a flow diagram of a method for detecting a malicious file according to various embodiments. In some embodiments, process 1000 is implemented at least in part on by system 100 of FIG. 1 and/or system 200 of FIG. 2. In some implementations, process 1000 may be implemented by a security entity (e.g., a firewall) such as in connection with enforcing a security policy with respect to files communicated across a network or in/out of the network, and/or an anti-malware application running on a client system, etc. In some implementations, process 1000 may be implemented by a client device such as a laptop, a smartphone, a personal computer, etc., such as in connection with executing or opening a file such as an email attachment.

At 1010, traffic is received. The system may obtain traffic such as in connection with routing traffic within/across a network, or mediating traffic into/out of a network such as a firewall, or a monitoring of email traffic or instant message traffic.

At 1020, a file is obtained from the traffic. In some embodiments, the system obtains the file from the received traffic. For example, the system identifies the file as an attachment to an email, identifies the file as being exchanged between two client devices via instant message program or other file exchange program, etc.

At 1030, imported API function names are obtained using a .NET header of the file. In some embodiments, 1030 corresponds to, or is similar to, 420 of process 400 of FIG. 4.

At 1040, unmanaged functions are determined. In some embodiments, the system determines a set of unmanaged functions from the imported API function names are obtained using a .NET header of the file. For example, the system determines which of the imported API function correspond to unmanaged functions. As an example, at least part of process 600 may be invoked in connection with determining the unmanaged functions.

At 1050, a determination is made as to whether the file is malicious. In some embodiments, the system determines whether the file is malicious based at least in in part on the unmanaged managed functions (e.g., the set of unmanaged functions imported into the file, such as via the .NET header). In some embodiments, 1050 corresponds to, or is similar to, 440 of process 400 of FIG. 4. In some embodiments, process 500 of FIG. 5 is performed in connection with 1050.

In response to determining that the file is malicious at 1050, process 1000 proceeds to 1060 at which one or more security policies are applied with respect to the file. In some embodiments, 1060 corresponds to, or is similar to, 860 of process 800 of FIG. 8. Thereafter, process 1000 proceeds to 1070.

In response to determining that the file is not malicious at 1050, process 1000 proceeds to 1070 at which the file is handled as non-malicious traffic. In some embodiments, 1070 corresponds to, or is similar to, 850 of process 800 of FIG. 8.

At 1080, a determination is made as to whether process 1000 is complete. In some embodiments, process 1000 is determined to be complete in response to a determination that no further samples are to be analyzed (e.g., no further predictions for files are needed), no further traffic is to be analyzed, an administrator indicates that process 1000 is to be paused or stopped, etc. In response to a determination that process 1000 is complete, process 1000 ends. In response to a determination that process 1000 is not complete, process 1000 returns to 1010.

Figure 11:
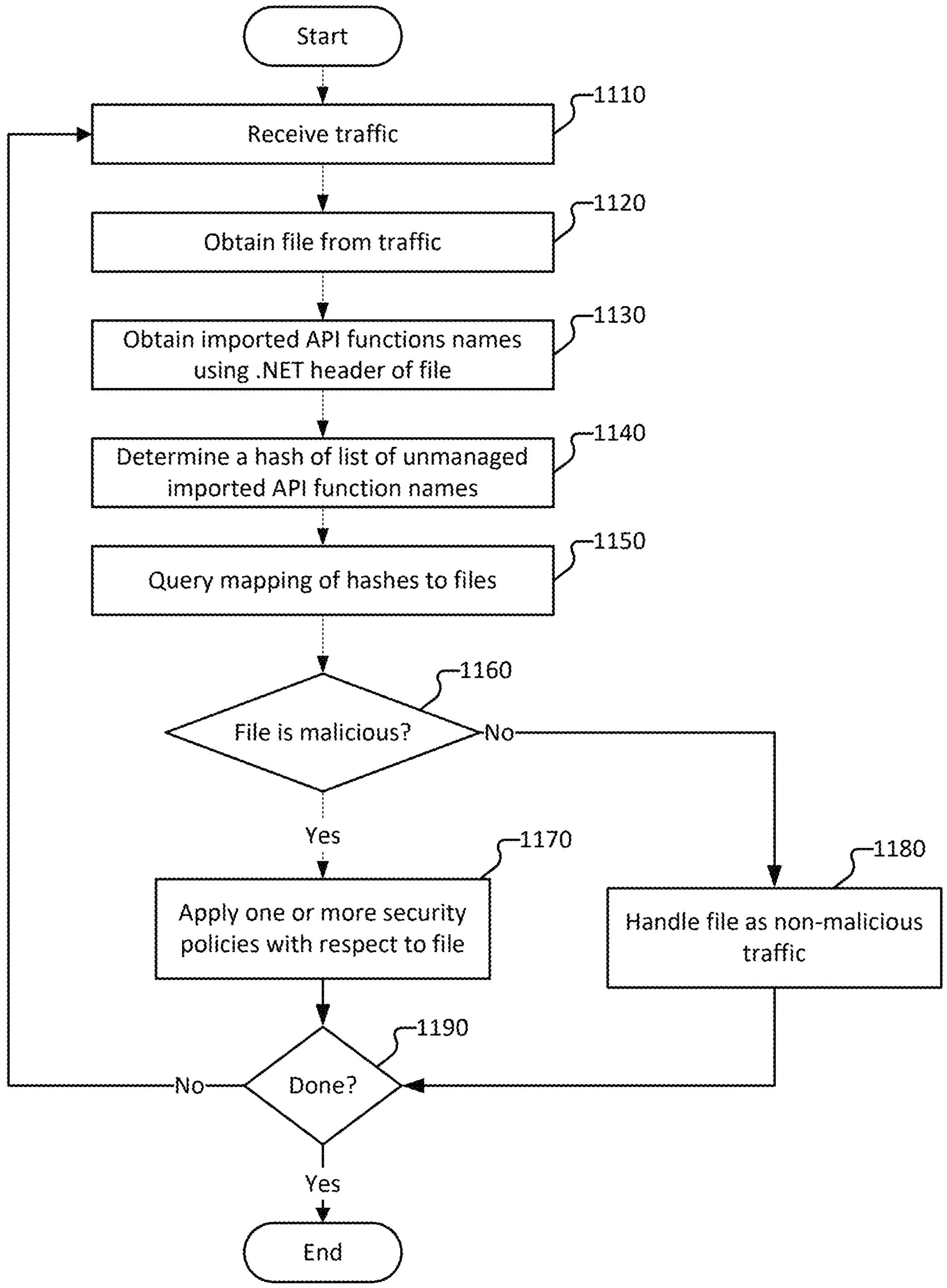
FIG. 11 is a flow diagram of a method for detecting a malicious file according to various embodiments.

FIG. 11 is a flow diagram of a method for detecting a malicious file according to various embodiments. In some embodiments, process 1100 is implemented at least in part on by system 100 of FIG. 1 and/or system 200 of FIG. 2. In some implementations, process 1100 may be implemented by a security entity (e.g., a firewall) such as in connection with enforcing a security policy with respect to files communicated across a network or in/out of the network, and/or an anti-malware application running on a client system, etc. In some implementations, process 1100 may be implemented by a client device such as a laptop, a smartphone, a personal computer, etc., such as in connection with executing or opening a file such as an email attachment.

At 1110, traffic is received. In some embodiments, 1110 corresponds to, or is similar to, 1010 of process 1000 of FIG. 10.

At 1120, a file is obtained from the traffic. In some embodiments, 1120 corresponds to, or is similar to, 1020 of process 1000 of FIG. 10.

At 1130, imported API function names are obtained using a .NET header of the file. In some embodiments, 1130 corresponds to, or is similar to, 1030 of process 1000 of FIG. 10.

At 1140, a hash of a list of unmanaged imported API function names is determined. In some embodiments, the system determines unmanaged functions based at least in part on the imported API function names (e.g., via the .NET header of the file). In some embodiments, the system determines a set of unmanaged functions from the imported API function names are obtained using a .NET header of the file, the system determines a list of the unmanaged functions, and determines a hash based at least in part on the list. As an example, the list comprises unmanaged function names corresponding to the set of unmanaged functions.

At 1150, a mapping of hashes to files is queried. In some embodiments, the system queries the mapping of hashes to files based at least in part on the hash of the list of unmanaged imported API function names. For example, the system performs a lookup with respect to the mapping of hashes to files to determine whether the mapping comprises the hash of the list of unmanaged imported API function names (e.g. to determine whether the mapping comprises a record corresponding to the determined/computed hash). In some embodiments, 1150 corresponds to, or is similar to, 840 of process 800 of FIGS. 8 and/or 930 of process 900 of FIG. 9.

At 1160, a determination is made as to whether the file is malicious. In some embodiments, 1160 corresponds to, or is similar to, 1050 of process 1000 of FIG. 10.

In response to determining that the file is malicious at 1160, process 1100 proceeds to 1170 at which one or more security policies are applied with respect to the file. In some embodiments, 1170 corresponds to, or is similar to, 860 of process 800 of FIG. 8. Thereafter, process 1100 proceeds to 1190.

In response to determining that the file is not malicious at 1160, process 1100 proceeds to 1180 at which the file is handled as non-malicious traffic. In some embodiments, 1180 corresponds to, or is similar to, 850 of process 800 of FIG. 8.

At 1190, a determination is made as to whether process 1100 is complete. In some embodiments, process 1100 is determined to be complete in response to a determination that no further samples are to be analyzed (e.g., no further predictions for files are needed), no further traffic is to be analyzed, an administrator indicates that process 1000 is to be paused or stopped, etc. In response to a determination that process 1100 is complete, process 1100 ends. In response to a determination that process 1100 is not complete, process 1100 returns to 1110.

Various examples of embodiments described herein are described in connection with flow diagrams. Although the examples may include certain steps performed in a particular order, according to various embodiments, various steps may be performed in various orders and/or various steps may be combined into a single step or in parallel.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:

one or more processors configured to:

receive a sample that comprises a .NET file, wherein the .NET file comprises a .NET header comprising a set of unmanaged imported API functions;

obtain unmanaged imported API function names for the set of unmanaged imported API functions based at least in part on the NET header of the .NET file;

determine a hash of a list of unmanaged imported API function names, wherein the list of unmanaged imported API function names comprises for each unmanaged imported API function in the list a pair comprising (a) an indication of the unmanaged API function name and (b) an indication of a corresponding library name; and determine whether the sample is malware based at least in part on the hash of the list of unmanaged imported API function names; and a memory coupled to the one or more processors and configured to provide the one or more processors with instructions.

2. The system of claim 1, wherein obtaining the imported API function names comprises:

parsing the .NET header of the .NET file; and extracting the imported API function names from a parsed .NET header.

3. The system of claim 2, wherein the imported API function names are extracted from the parsed .NET header based at least in part on an index table.

4. The system of claim 3, wherein the index table comprises an ImplMap table that indicates a set of unmanaged methods that are imported in connection with execution of the .NET file.

5. The system of claim 2, wherein the imported API function names are extracted from the parsed .NET header based at least in part on a MethodDef table.

6. The system of claim 1, wherein determining the hash of the list of unmanaged imported API function names comprises:

determining a set of unmanaged imported API functions based on the imported API function names obtained based at least in part on the .NET header; and generating the hash of the list of unmanaged imported API function names based at least in part on a predetermined hashing function.

7. The system of claim 6, wherein the predetermined is hashing function comprises at least one of a SHA-256 hashing algorithm, an MD5 hashing algorithm, and a SHA-1 hashing algorithm.

8. The system of claim 1, wherein the one or more processors are further configured to:

send, to a security entity, an indication that the sample is malicious.

9. The system of claim 8, wherein sending the indication that the sample is malicious to the security entity comprises:

updating a blacklist of files that are deemed to be malicious, the blacklist of files being updated to include an identifier corresponding to the sample.

10. The system of claim 8, wherein the security entity corresponds to a firewall.

11. The system of claim 1, wherein determining whether the sample is malware based at least in part on the hash of the list of unmanaged imported API function names is performed in a sandbox environment.

12. The system of claim 1, wherein the determining whether the sample is malware based at least in part on the hash of the list of unmanaged imported API function names is performed at a security entity.

13. The system of claim 1, wherein the imported API function names are obtained based at least in part on a value corresponding to an ImportName field.

14. The system of claim 13, wherein in response to a determination the value corresponding to the ImportName field is not equal to 0, obtaining the imported API function names comprises determining a set of one or more library names based at least in part on a #Strings stream of the .NET file.

15. The system of claim 13, wherein in response to a determination the value corresponding to the ImportName field is equal to 0, obtaining the imported API function names comprises:

obtaining a value from a row of a MethodDef table;

obtaining a function name from a #Strings stream based at least in part on the value from the row of the MethodDef table;

determine whether a PE header of the .NET file comprises an import table; and in response to a determination that the PE header of the .NET file does not comprise the import table, determine a library name corresponding to the function name based at least in part on the import table.

16. The system of claim 15, wherein determining the library name corresponding to the function name based at least in part on the import table comprises parsing the import table to obtain the library name from the corresponding function name.

17. The system of claim 1, wherein the one or more processors are further configured to:

ensure that a library name corresponding to an unmanaged function does not have a file extension;

determine a string based at least in part on the library name and the unmanaged function; and add the string to the list of unmanaged imported API function names.

18. The system of claim 17, wherein the string is determined by ensuring that the library name and a name of the unmanaged function do not comprise capital letters and appending the name of the unmanaged function to the library name with a predefined separator comprised between the name of the unmanaged function and the library name.

19. The system of claim 1, wherein hashing the list of unmanaged imported API function names comprises:

generating a string representing the list of unmanaged imported API function names based at least in part on the indication of the unmanaged API function name and the indication of the corresponding library name for a plurality of unmanaged API functions; and computing the hash based on the string representing the list of unmanaged imported API function names.

20. A method, comprising:

receiving a sample that comprises a .NET file, wherein the .NET file comprises a .NET header comprising a set of unmanaged imported API functions;

obtaining unmanaged imported API function names for the set of unmanaged imported API functions based at least in part on the .NET header of the .NET file;

determining a hash of a list of unmanaged imported API function names, wherein the list of unmanaged imported API function names comprises for each unmanaged imported API function in the list a pair comprising (a) an indication of the unmanaged API function name and (b) an indication of a corresponding library name; and determining whether the sample is malware based at least in part on the hash of the list of unmanaged imported API function names.

21. A computer program product embodied in a non-transitory computer readable medium and comprising computer instructions for:

receiving a sample that comprises a .NET file, wherein the NET file comprises a .NET header comprising a set of unmanaged imported API functions;

obtaining unmanaged imported API function names for the set of unmanaged imported API functions based at least in part on the NET header of the .NET file;

determining a hash of a list of unmanaged imported API function names, wherein the list of unmanaged imported API function names comprises for each unmanaged imported API function in the list a pair comprising (a) an indication of the unmanaged API function name and (b) an indication of a corresponding library name; and determining whether the sample is malware based at least in part on the hash of the list of unmanaged imported API function names.

* * * * *